US 011182341B2

(12) United States Patent
Hakamata et al.

(10) Patent No.: US 11,182,341 B2
(45) Date of Patent: Nov. 23, 2021

(54) RECORDING MEDIUM RECORDING INDEXED DATA GENERATION PROGRAM, INDEXED DATA GENERATION METHOD AND RETRIEVAL METHOD

(71) Applicant: FUJITSU LIMITED, Kawasaki (JP)

(72) Inventors: Yukari Hakamata, Yokohama (JP); Junki Hakamata, Yokohama (JP); Masahiro Kataoka, Kamakura (JP); Ryosuke Hyogo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 315 days.

(21) Appl. No.: 16/280,046

(22) Filed: Feb. 20, 2019

(65) Prior Publication Data

US 2019/0251062 A1 Aug. 15, 2019

Related U.S. Application Data

(63) Continuation of application No. PCT/JP2016/080034, filed on Oct. 7, 2016.

(51) Int. Cl.
*G06F 16/13* (2019.01)
*G06F 16/00* (2019.01)
(Continued)

(52) U.S. Cl.
CPC ............ *G06F 16/137* (2019.01); *G06F 16/00* (2019.01); *G06F 16/221* (2019.01);
(Continued)

(58) Field of Classification Search
CPC ........ G06F 40/117; G06F 40/154; G06F 8/44; G06F 16/2237; G06F 16/137;
(Continued)

(56) References Cited

U.S. PATENT DOCUMENTS 6,349,294 B1 * 2/2002 Shaath .................... G06F 3/061
707/715
6,405,187 B1 * 6/2002 Egan .................. G06F 16/2228
(Continued)

FOREIGN PATENT DOCUMENTS

JP 2001-056836 A 2/2001
JP 2002-015266 A 1/2002
(Continued)

OTHER PUBLICATIONS

International Search Report dated Nov. 22, 2016 for PCT/JP2016/080034 filed on Oct. 7, 2016, 8 pages including English Translation.

*Primary Examiner* — David T. Brooks
(74) *Attorney, Agent, or Firm* — Xsensus LLP

(57) ABSTRACT

A non-transitory computer-readable recording medium recording an indexed data generation program causing a computer to execute processing of generating ledger sheet output format data from ledger sheet data including a ledger sheet having a plurality of columns; generating index information for words, characters, or numerical values, the index information including positional information capable of specifying attributes of the plurality of columns and a positional relationship in the ledger sheet data between pieces of data corresponding to the plurality of columns included in the ledger sheet output format data; and outputting an output file including the index information and the ledger sheet output format data.

10 Claims, 22 Drawing Sheets

(51) Int. Cl.
   *G06F 16/31*    (2019.01)
   *G06F 16/22*    (2019.01)
   *G06F 16/901*   (2019.01)

(52) U.S. Cl.
   CPC ........ *G06F 16/2228* (2019.01); *G06F 16/316* (2019.01); *G06F 16/901* (2019.01)

(58) Field of Classification Search
   CPC ...... G06F 16/00; G06F 16/316; G06F 16/221; G06F 16/901; G06F 16/03; G06F 16/81; G06F 16/2282; G06F 40/12; G06F 40/123; G06F 40/126; G06F 40/129; G06F 40/131; G06F 40/14; G06F 40/143; G06F 40/146; G06F 40/177; G06F 40/18; G06F 40/242; G06F 7/74; G06F 16/14; G06F 16/148; G06F 16/164; G06F 16/22; G06F 16/2228; G06F 16/2264; G06F 16/31; G06F 16/313
   See application file for complete search history.

(56) References Cited

U.S. PATENT DOCUMENTS

| | | | | |
|---|---|---|---|---|
| 2004/0015467 | A1* | 1/2004 | Fano | G06F 16/48 |
| 2004/0143574 | A1* | 7/2004 | Nakamura | G06F 16/316 |
| 2008/0059488 | A1* | 3/2008 | Iyengar | G06F 16/31 |
| 2009/0234818 | A1* | 9/2009 | Lobo | G06F 40/226 |
| 2012/0233175 | A1 | 9/2012 | Akita | |
| 2012/0271813 | A1* | 10/2012 | Shen | G06F 16/22 707/711 |
| 2012/0296916 | A1* | 11/2012 | Bittles | G06F 16/81 707/741 |
| 2012/0303633 | A1* | 11/2012 | He | G06F 16/2453 707/745 |
| 2013/0060740 | A1* | 3/2013 | Ono | G06F 16/81 707/693 |
| 2014/0369602 | A1* | 12/2014 | Meier | G06K 9/6218 382/182 |
| 2015/0026556 | A1* | 1/2015 | Stadermann | G06F 40/183 715/227 |
| 2015/0278268 | A1* | 10/2015 | El-Ali | G06F 16/245 707/722 |
| 2015/0356169 | A1* | 12/2015 | Popov | G06F 16/316 707/742 |
| 2015/0379057 | A1* | 12/2015 | Wang | G06F 16/2455 707/723 |
| 2016/0371275 | A1* | 12/2016 | Bernstein | G06F 16/20 |
| 2017/0116172 | A1* | 4/2017 | Mungi | G06F 16/3331 |
| 2017/0228407 | A1* | 8/2017 | Mano | G06F 16/221 |
| 2017/0329749 | A1* | 11/2017 | Milward | G06F 16/86 |

FOREIGN PATENT DOCUMENTS

| | | |
|---|---|---|
| JP | 2005-084784 A | 3/2005 |
| JP | 2012-123574 A | 6/2012 |
| JP | 2012-123575 A | 6/2012 |
| JP | 2013-045208 A | 3/2013 |
| WO | 2011/132420 A1 | 10/2011 |

\* cited by examiner

VALID RANGE OF RETRIEVAL CONDITIONS

● ALL  ○ LEDGER SHEET  ○ PAGE  ○ RECORD

ITEM CONDITION

RETRIEVAL CONDITION 1     RETRIEVAL TARGET
[PRODUCT NAME ▼]          [REIZOUKO]

RETRIEVAL CONDITION 2
[▼]                       [         ]

RETRIEVAL CONDITION 1
[▼]                       [         ]     [START RETRIEVAL]

VALID RANGE OF RETRIEVAL CONDITIONS
● ALL   ○ LEDGER SHEET   ○ PAGE   ○ RECORD

ITEM CONDITION

RETRIEVAL CONDITION 1      RETRIEVAL TARGET
[ADDRESS ▼]                [KAMAKURA]

RETRIEVAL CONDITION 2
[         ▼]               [         ]

RETRIEVAL CONDITION 3
[         ▼]               [         ]        [START RETRIEVAL]

FIG. 16

|  | | ... | 7 | 6 | 5 | 4 | 3 | 2 | 1 | 0 |
|---|---|---|---|---|---|---|---|---|---|---|
| ADDRESS | | ... | 0 | 0 | 0 | 1 | 0 | 0 | 0 | 0 |

|  | | ... | 7 | 6 | 5 | 4 | 3 | 2 | 1 | 0 |
|---|---|---|---|---|---|---|---|---|---|---|
| SEX | | ... | 1 | 0 | 0 | 0 | 0 | 0 | 0 | 0 |

|  | | ... | 7 | 6 | 5 | 4 | 3 | 2 | 1 | 0 |
|---|---|---|---|---|---|---|---|---|---|---|
| MASK BIT | | ... | 0 | 1 | 1 | 1 | 0 | 0 | 0 | 0 |

|  | | ... | 7 | 6 | 5 | 4 | 3 | 2 | 1 | 0 |
|---|---|---|---|---|---|---|---|---|---|---|
| KAMAKURA | | ... | 0 | 0 | 1 | 0 | 0 | 0 | 1 | 0 |

AND OPERATION

|  | | ... | 7 | 6 | 5 | 4 | 3 | 2 | 1 | 0 |
|---|---|---|---|---|---|---|---|---|---|---|
| AND RESULT | | ... | 0 | 0 | 1 | 0 | 0 | 0 | 0 | 0 |

FIG. 17
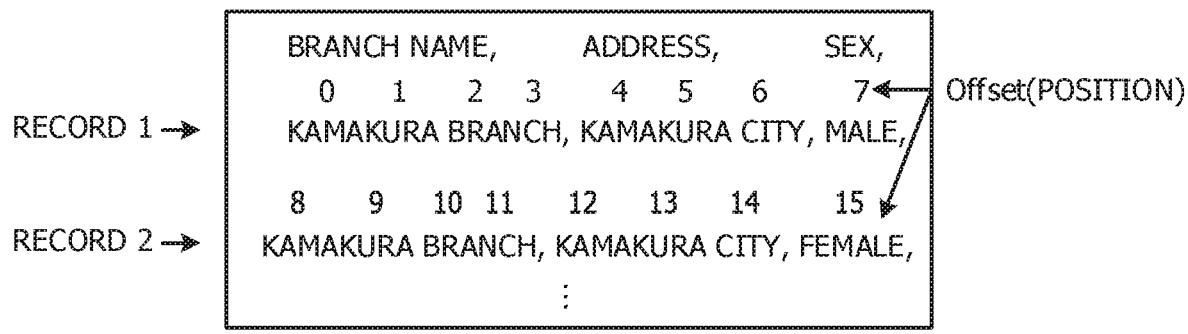
```
                ... 15 14 13 12 11 10 9 8 7 6 5 4 3 2 1 0
BRANCH NAME ... | 0  0  0  0| 0  0  0 1|0 0 0 0|0 0 0 1|
                ... 15 14 13 12 11 10 9 8 7 6 5 4 3 2 1 0
    ADDRESS ... | 0  0  0  1| 0  0  0 0|0 0 0 1|0 0 0 0|
                ... 15 14 13 12 11 10 9 8 7 6 5 4 3 2 1 0
        SEX ... | 1  0  0  0| 0  0  0 0|1 0 0 0|0 0 0 0|
          ⋮                        ⋮
                ... 15 14 13 12 11 10 9 8 7 6 5 4 3 2 1 0
       KAMA ... | 0  0  0  1| 0  0  0 1|0 0 0 1|0 0 0 1|
                ... 15 14 13 12 11 10 9 8 7 6 5 4 3 2 1 0
       KURA ... | 0  0  1  0| 0  0  1 0|0 0 1 0|0 0 1 0|
          ⋮                        ⋮
                ... 15 14 13 12 11 10 9 8 7 6 5 4 3 2 1 0
       MALE ... | 0  0  0  0| 0  0  0 0|1 0 0 0|0 0 0 0|
                ... 15 14 13 12 11 10 9 8 7 6 5 4 3 2 1 0
     FEMALE ... | 1  0  0  0| 0  0  0 0|0 0 0 0|0 0 0 0|
          ⋮                        ⋮
                ... 16 15 14 13 12 11 10 9 8 7 6 5 4 3 2 1 0
RECORD SEPARATOR ... |1| 0  0  0  0| 0  0  0 1|0 0 0 0|0 0 0 1|
```

FIG. 18

VALID RANGE OF RETRIEVAL CONDITIONS

○ ALL  ○ LEDGER SHEET  ○ PAGE  ⦿ RECORD

COLUMN CONDITION

RETRIEVAL CONDITION 1    RETRIEVAL STRING

[ ADDRESS ▼ ]  [ KAMAKURA ]

RETRIEVAL CONDITION 2

[ ALL ▼ ]  [ FEMALE ]

RETRIEVAL CONDITION 3

[ ▼ ]  [ ]  [ START RETRIEVAL ]

FIG. 19

|  | ... | 15 14 13 12 | 11 10 9 8 | 7 6 5 4 | 3 2 1 0 |
|---|---|---|---|---|---|
| ADDRESS | ... | 0 0 0 1 | 0 0 0 0 | 0 0 0 1 | 0 0 0 0 |

|  | ... | 15 14 13 12 | 11 10 9 8 | 7 6 5 4 | 3 2 1 0 |
|---|---|---|---|---|---|
| SEX | ... | 1 0 0 0 | 0 0 0 0 | 1 0 0 0 | 0 0 0 0 |

|  | ... | 15 14 13 12 | 11 10 9 8 | 7 6 5 4 | 3 2 1 0 |
|---|---|---|---|---|---|
| MASK BIT | ... | 0 1 1 1 | 0 0 0 0 | 0 1 1 1 | 0 0 0 0 |

|  | ... | 15 14 13 12 | 11 10 9 8 | 7 6 5 4 | 3 2 1 0 |
|---|---|---|---|---|---|
| KAMAKURA | ... | 0 0 1 0 | 0 0 1 0 | 0 0 1 0 | 0 0 1 0 |

|  | ... | 15 14 13 12 | 11 10 9 8 | 7 6 5 4 | 3 2 1 0 |
|---|---|---|---|---|---|
| AND RESULT | ... | 0 0 1 0 | 0 0 0 0 | 0 0 1 0 | 0 0 0 0 |

|  | ... | 15 14 13 12 | 11 10 9 8 | 7 6 5 4 | 3 2 1 0 |
|---|---|---|---|---|---|
| FEMALE | ... | 1 0 0 0 | 0 0 0 0 | 0 0 0 0 | 0 0 0 0 |

|  | ... | 16 | 15 14 13 12 | 11 10 9 8 | 7 6 5 4 | 3 2 1 0 |
|---|---|---|---|---|---|---|
| RECORD SEPARATION POSITION | ... | 1 | 0 0 0 0 | 0 0 0 1 | 0 0 0 0 | 0 0 0 1 |

PRESENT IN RECORD 2     NOT PRESENT IN RECORD 1

RECORDING MEDIUM RECORDING INDEXED DATA GENERATION PROGRAM, INDEXED DATA GENERATION METHOD AND RETRIEVAL METHOD

CROSS-REFERENCE TO RELATED APPLICATION

This application is a continuation application of International Application PCT/JP2016/080034 filed on Oct. 7, 2016 and designated the U.S., the entire contents of which are incorporated herein by reference.

FIELD

The embodiments discussed herein are related to an indexed data generation program, an indexed data generation method, an indexed data generation system, a retrieval program, a retrieval method, and a retrieval system.

BACKGROUND ART

A PDF (Portable Document Format), for example, has heretofore been used to ensure that a ledger sheet is outputted in an intended output format during printing.

Related art is disclosed in Japanese Laid-open Patent Publication No. 2013-045208 and Japanese Laid-open Patent Publication No. 2001-056836.

SUMMARY

According to one aspect of the embodiments, a non-transitory computer-readable recording medium recording an indexed data generation program causing a computer to execute processing of generating ledger sheet output format data from ledger sheet data including a ledger sheet having a plurality of columns; generating index information for words, characters, or numerical values, the index information including positional information capable of specifying attributes of the plurality of columns and a positional relationship in the ledger sheet data between pieces of data corresponding to the plurality of columns included in the ledger sheet output format data; and outputting an output file including the index information and the ledger sheet output format data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a bitmap index according to Example 1.

FIG. 5 is a diagram illustrating an example of an image in which a retrieval target is entered.

FIG. 7 is a diagram illustrating an example of string determination processing according to Example 1.

FIG. 8 is a diagram illustrating an example of retrieval condition determination processing according to Example 1.

FIG. 15 is a diagram illustrating an example of an image in which a retrieval target is entered.

FIG. 16 is a diagram illustrating an example of retrieval processing according to Example 2.

FIG. 17 is a diagram illustrating an example of ledger sheet output format data and a bitmap index according to Example 3.

FIG. 18 is a diagram illustrating an example of an image in which a retrieval target is entered.

FIG. 19 is a diagram illustrating an example of retrieval processing according to Example 3.

DESCRIPTION OF EMBODIMENTS

A PDF file created for printing is used not only for printing or storage but also for retrieval and the like. However, the PDF file created for printing is demanded to have a reduced file size, and thus may not be used for advanced retrieval and the like. In order to perform such advanced retrieval, for example, that metadata such as positional information and attribute information of strings and the like are embedded into the PDF file by extending a tag. Moreover, in order to perform such advanced retrieval, for example, an index associating a ledger sheet item with the number of pages with a specific key is generated.

However, when the tag is extended, for example, the file size is increased and there is no index. Therefore, retrieval may not be quickly performed.

For example, even when the conventional technology is used to create an index associating words and numerical values with page information by the word or numerical value, such an index only includes the page information. Therefore, retrieval corresponding to the item of the word or numerical value may not be performed. For this reason, even when the index is referred to, retrieval candidates, after being narrowed down by retrieval, have to be individually checked if the retrieval candidates correspond to the retrieval target items.

For example, in the case of retrieval of a numerical value in a ledger sheet, even when a numerical value "100" is retrieved, retrieval candidates of "unit price" being "100", "quantity" being "100", and "amount" being "100" are displayed. Therefore, it is required to check if the numerical value to be retrieved corresponds to the target item. Meanwhile, in the case of retrieval of a word, again, even when "Kamakura" is retrieved, retrieval candidates of "branch name" being "Kamakura", "address" being "Kamakura", and "name" being "Kamakura" are displayed.

Therefore, by referring to the page data set as the retrieval candidates for the PDF file, the page data has to be individually checked if the page data corresponds to the retrieval target item.

Whether or not the page data corresponds to the retrieval target item may be determined quickly.

Hereinafter, with reference to the drawings, detailed description is given of examples of an indexed data generation program, an indexed data generation method, an indexed data generation system, a retrieval program, a retrieval method, and a retrieval system disclosed in the present application. Note that these examples are not intended to limit the scope of right. The examples may be combined as appropriate without causing inconsistency in processing content.

Example 1

[Example of Ledger Sheet File Generation According to Example 1]

Figure 1:
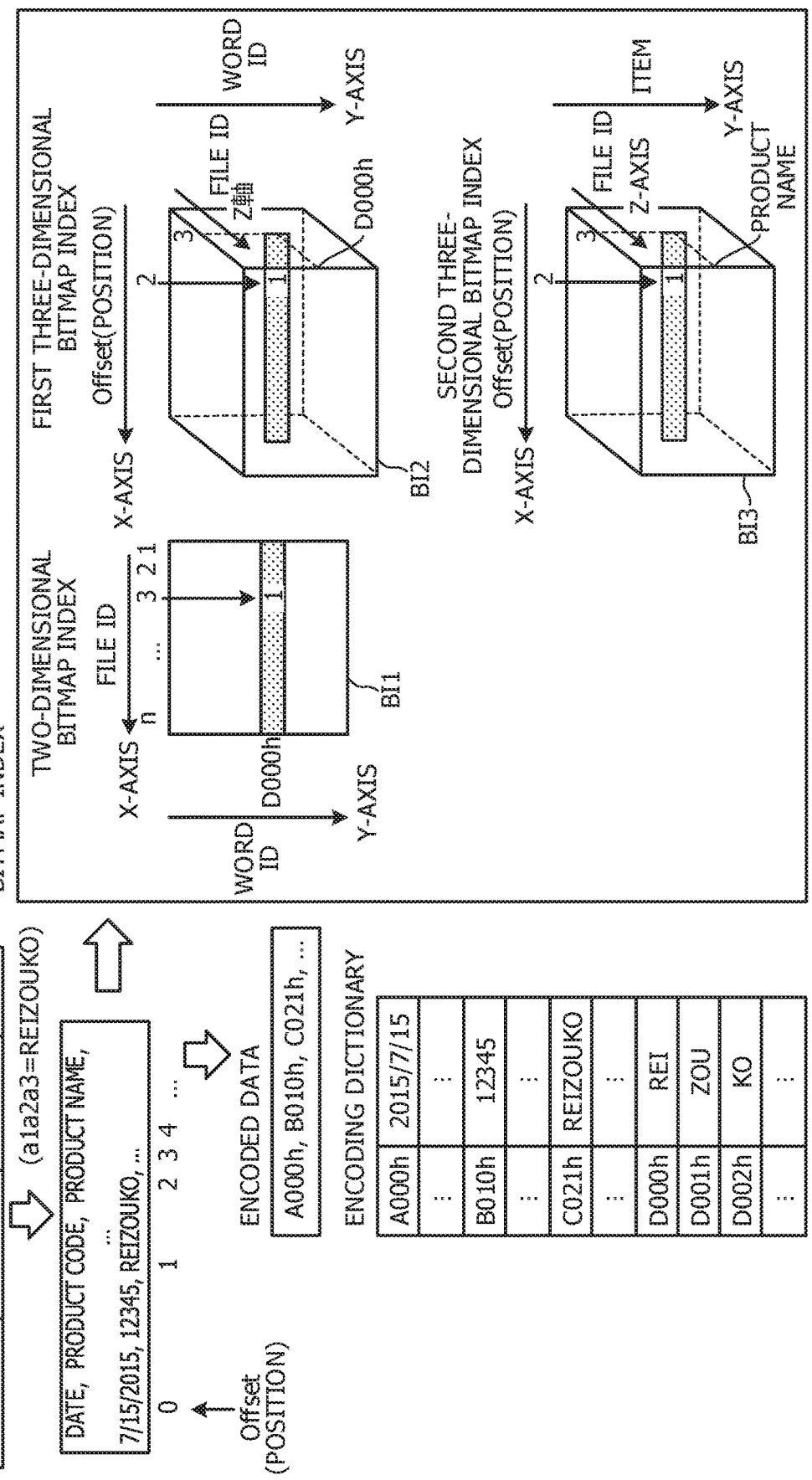
FIG. 1 is a diagram illustrating an example of a flow of ledger sheet file generation processing according to Example 1.

FIG. 1 is a diagram illustrating an example of a flow of ledger sheet file generation processing according to Example 1. A ledger sheet output device generates ledger sheet output format data from inputted ledger sheet data. The ledger sheet output device generates, based on the generated ledger sheet output format data, a bitmap index including positional information capable of specifying respective attributes (which may be hereinafter referred to as the "items") of a plurality of items (columns) in a ledger sheet and positional relationships in the ledger sheet data among data corresponding to the plurality of items included in the ledger sheet output format data, respectively. Then, the ledger sheet output device generates a ledger sheet file including the ledger sheet output format data and the bitmap index. The ledger sheet data includes ledger sheets with a plurality of items.

An example of ledger sheet file generation processing is described below. For example, the ledger sheet output device that executes the ledger sheet file generation processing retrieves a file 3 including ledger sheet data. Note that "3" of the file 3 represents that its file ID is "3". The file 3 has "date", "product code", "product name", and the like as items of a ledger sheet. For example, the "date" item includes "2015/7/15". For example, the "product code" item includes "12345". For example, the "product name" item includes "a1a2a3". Here, description is given assuming that "a1a2a3" is "reizouko" expressed in Japanese Kanji. Note that the items in the ledger sheet are not limited to those described above.

The ledger sheet output device generates ledger sheet output format data from the ledger sheet data included in the file 3. The ledger sheet output format data is CSV (Comma-Separated Values) format data. The ledger sheet output format data includes records composed of data of a plurality of comma-separated items. Note that, although FIG. 1 illustrates an example with one record, the ledger sheet output format data includes more than one record.

The ledger sheet output device generates encoded data and an encoding dictionary by encoding ledger sheet output format data including a string composed of words, characters, and the like as well as a numerical sequence composed of numerical values, for the file 3. Note that, in the following description, the string and the numerical sequence are simply referred to as the "string". The ledger sheet output device encodes the "date" item "2015/7/15", for example, into "A000h". The ledger sheet output device encodes the "product code" item "12345", for example, into "B010h". The ledger sheet output device encodes the "product name" item "Reizouko", for example, into "C021h". Also, when a string in the ledger sheet output format data is, for example, alphabets, the ledger sheet output device encodes the string by word. For example, "Liquid Crystal Television" is divided into "Liquid", "Crystal", and "Television", which are encoded, respectively. Each piece of the ledger sheet output format data is encoded by item. The ledger sheet output device generates encoded data by encoding the ledger sheet output format data.

Meanwhile, when a string in the ledger sheet output format data is Japanese, the ledger sheet output device encodes the string by character. For example, "Reizouko" is divided into "Rei", "Zou", and "Ko", which are encoded, respectively. The ledger sheet output device encodes "Rei", for example, into "D000h". The ledger sheet output device encodes "Zou", for example, into "D001h". The ledger sheet output device encodes "Ko", for example, into "D002h". Note that, when the string in the ledger sheet output format data is Japanese, codes used for the encoded data are those obtained by encoding by string.

Hereinafter, codes obtained by encoding each piece of the ledger sheet output format data and the like are each referred to as the "word ID".

The encoding dictionary includes a static dictionary and a dynamic dictionary. The static dictionary refers to a dictionary that specifies an appearance frequency of a word appearing in a document, based on a general English dictionary, Japanese dictionary, textbooks, and the like, and assigns a shorter code (word ID) to a word with a higher appearance frequency. The static dictionary has static codes previously registered therein, which are codes corresponding to respective words. On the other hand, the dynamic dictionary is a dictionary in which words not registered in the static dictionary are associated with dynamic codes (codes), which are dynamically assigned. Such words not registered in the static dictionary include less frequently appearing words (low-frequency words), characters, unknown words, numerical values, times, tags, and the like. Here, the unknown words are those not registered in the static dictionary and having a characteristic of repeatedly appearing in a document to be encoded. In the dynamic dictionary, words associated with the dynamic codes are registered in order of appearance of the words not registered in the static dictionary. Note that the encoding dictionary used to generate the encoded data may be different from an encoding dictionary used to generate a bitmap index.

The ledger sheet output device generates information about a word ID for a file ID. The ledger sheet output device also generates information about the word ID and a position of a string indicated by the word ID, for the file ID. The ledger sheet output device further generates information about an item in a ledger sheet and the position of the item in the ledger sheet, for the file ID. The ledger sheet output device sets the presence or absence of the string indicated by the word ID in a two-dimensional bitmap index BI1, for the file 3, based on the generated information. The ledger sheet output device also sets the word ID and the position of the string indicated by the word ID in a first three-dimensional bitmap index BI2, for the file 3, based on the generated information. The ledger sheet output device further sets the item in the ledger sheet and the position indicated by the item in the ledger sheet in a second three-dimensional bitmap index BI3, for the file 3, based on the generated information.

When the string in the ledger sheet output format data is Japanese, word IDs obtained by encoding the data by character are used in the two-dimensional bitmap index BI1, the first three-dimensional bitmap index BI2, and the like. For example, when the string is a Japanese word "Reizouko", three word IDs corresponding to "Rei", "Zou", and "Ko" are used. On the other hand, for example, when the string is expressed in alphabet such as "Liquid Crystal Television", three word IDs corresponding to "Liquid", "Crystal", and "Television" are used.

Here, the two-dimensional bitmap index BI1 is an index for full-text retrieval, which is a bit string obtained by connecting a pointer that specifies a string to a bit that indicates the presence or absence of the string in each file. More specifically, the two-dimensional bitmap index BI1 is a bitmap obtained by indexing the presence or absence of the string included in a file, for each file. This bitmap may be used, during retrieval processing, as an index indicating whether or not a string to be retrieved is included. The word ID is used, for example, as the pointer to specify the string. Note that the string itself may be used, for example, as the pointer to specify the string. More specifically, the two-dimensional bitmap index BI1 is obtained by putting together bitmaps for every string indicated by the pointer that specifies the string. As illustrated in FIG. 1, the X-axis of the two-dimensional bitmap index BI1 represents the file ID, while the Y-axis thereof represents the word ID. That is, the two-dimensional bitmap index BI1 represents the presence or absence of the string indicated by the word ID for each of the files indicated by a plurality of file IDs.

Here, the first three-dimensional bitmap index BI2 is a bitmap index obtained by adding the position of a string in each file to the two-dimensional bitmap index BI1. More specifically, the first three-dimensional bitmap index BI2 is a bitmap obtained by indexing the position of a string included in a file, where the string is located in each file. As illustrated in FIG. 1, the X-axis of the first three-dimensional bitmap index BI2 represents Offset (position), the Y-axis thereof represents the word ID, and the Z-axis represents the file ID. The first three-dimensional bitmap index BI2 represents the position of the string indicated by the word ID for each of the files indicated by a plurality of file IDs. More specifically, the first three-dimensional bitmap index BI2 is index information including positional information capable of specifying positional relationships in the ledger sheet data between the strings.

The second three-dimensional bitmap index BI3 refers to a bitmap obtained by indexing the positions of the items of the ledger sheet in each file. As illustrated in FIG. 1, the X-axis of the second three-dimensional bitmap index BI3 represents Offset (position), the Y-axis thereof represents the item of the ledger sheet, and the Z-axis represents the file ID. More specifically, the second three-dimensional bitmap index BI3 is index information including positional information capable of specifying positional relationships in the ledger sheet data between the items of the ledger sheet.

Here, description is given of processing of generating each bitmap index for the file 3 by the ledger sheet output device.

The ledger sheet output device encodes a string included in the item of the ledger sheet in the file 3 into a word ID.

Note that, when the string is a Japanese word, the ledger sheet output device encodes the string by character into the word ID. For example, "Reizouko" that is the "product name" is a Japanese word, and thus the string is encoded by character into the word ID. Here, description is given of processing of generating each bitmap index for "Rei" of the item "product name" in the ledger sheet. The word ID for "Rei" of the "product name" is "D000h". It is assumed that the position of "Rei" in the file 3 is "2".

The ledger sheet output device sets the presence or absence of the character indicated by the word ID "D000h" in the two-dimensional bitmap index BI1 for the file 3 based on the generated information. In the two-dimensional bitmap index BI1 illustrated in FIG. 1, a bit value "1" meaning that "D000h" is present in the file with the file ID "3" is set in a bit corresponding to the file ID "3". Note that, when "D000h" is not present in the file, for example, a bit value "0" is set in the bit corresponding to the file ID.

The ledger sheet output device sets the position "2" of the character indicated by the word ID "D000h" in the first three-dimensional bitmap index BI2 for the file 3 based on the generated information. In the first three-dimensional bitmap index BI2 illustrated in FIG. 1, the bit value "1" meaning that "D000h" is present at the position "2" of the file with the file ID "3" is set in a bit corresponding to the position "2" of the file ID "3". Note that, when "D000h" is not present at a predetermined position in the file, the bit value "0" is set in the bit corresponding to the predetermined position of the file ID.

The ledger sheet output device also sets the position of the item "product name" in the ledger sheet in the second three-dimensional bitmap index BI3 for the file 3 based on the generated information. In the second three-dimensional bitmap index BI3 illustrated in FIG. 1, the bit value "1" meaning that the item "product name" in the ledger sheet starts from the position "2" of the file 3 is set in a bit corresponding to the position "2" of the file ID "3". In the second three-dimensional bitmap index BI3, the bit value "1" is set only in the bit corresponding to the position where the item in the ledger sheet starts. For example, the item "product name" in the ledger sheet starts from the position "2" and ends at a position "4" in the file 3. Therefore, as for an item following the item "product name" in the ledger sheet, the bit value "1" is set in a bit corresponding to a position "5" in the second three-dimensional bitmap index BI3.

Accordingly, the ledger sheet output device generates the respective bitmap indexes BI1 to BI3 including the positional information capable of specifying the positional relationships in the ledger sheet data between the word IDs obtained by encoding the plurality of items in the ledger sheet and the respective data of the ledger sheet, for the file 3. The ledger sheet output device generates hashed indexes from the respective bitmap indexes BI1 to BI3. Then, the ledger sheet output device outputs an encoded file having index information on the respective hashed indexes and a ledger sheet file including the ledger sheet output format data, as output files. The hashed indexes are described later.

[Example of Bitmap Index]

Figure 2:
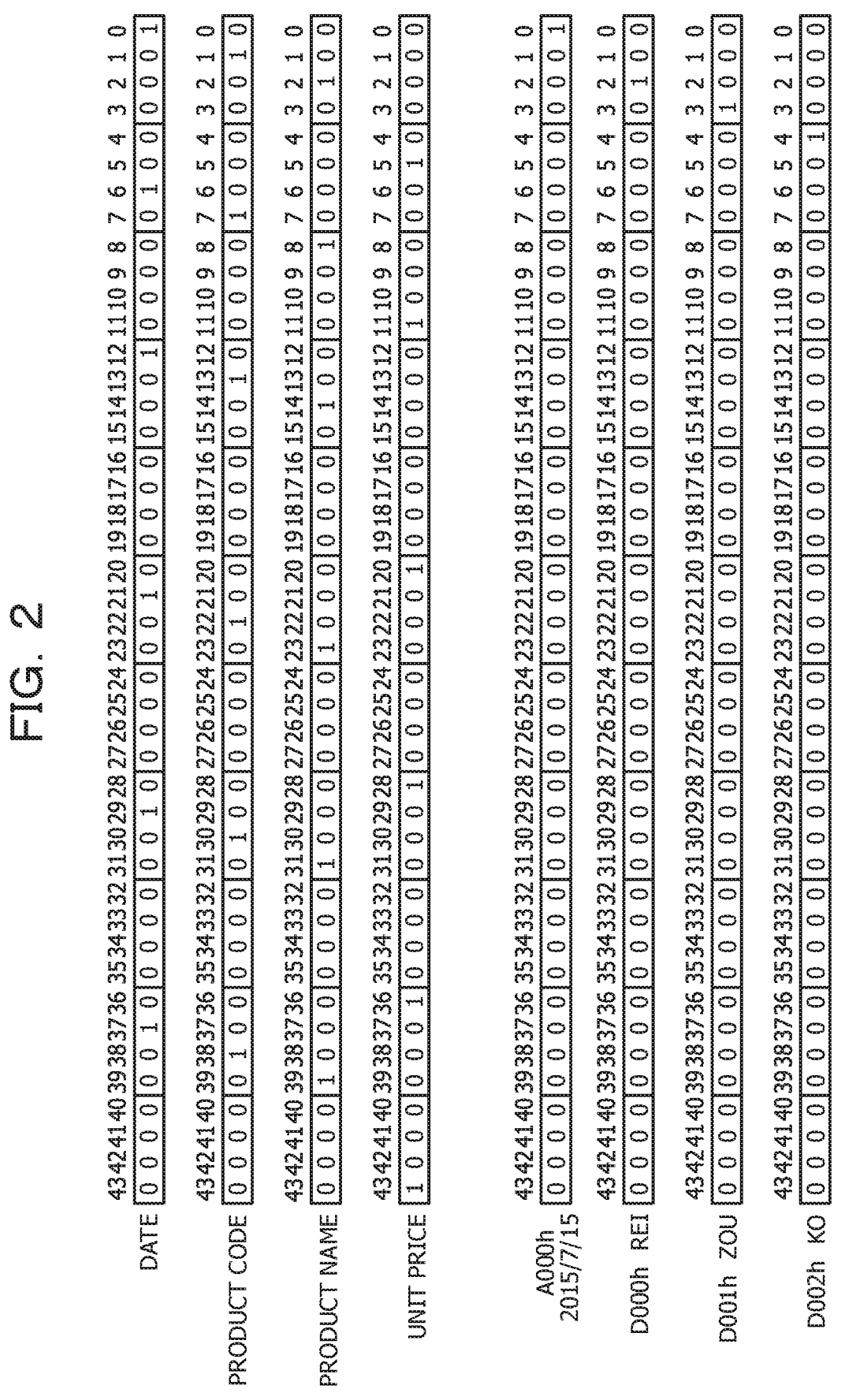

Next, with reference to FIG. 2, a bitmap index is described. FIG. 2 is a diagram illustrating an example of the bitmap index of Example 1. Here, description is given of, as an example, a bitmap index for the items of the ledger sheet in the file 3. Moreover, description is given of, as an example, a bitmap index for "2015/7/15" of the item "date" in the ledger sheet and for the word ID corresponding to the item "Reizouko" in the ledger sheet for the file 3.

In the bitmap index for the items of the ledger sheet, positions and bits corresponding to the positions are allocated in order of item from the first record in the file 3. Then, the bit value of the bit corresponding to the position of the item is set to "1". When the position and the bit corresponding to the position are allocated to the last item of the ledger sheet for a certain record, a next position and a next bit corresponding to the position are allocated to the first item of the next record.

A bitmap of the item "date" in the ledger sheet is " . . . 1000001". This represents that data on the item "date" in the ledger sheet of the first record is stored in the $0^{th}$ bit at a position "0" in the file 3. It is also represented that data on the item "date" in the ledger sheet of the next record is stored in the $6^{th}$ bit at a position "6" in the file 3. Here, data on the item "date" in the ledger sheet is stored in bits corresponding to positions "12", "21", "29", and "37".

A bitmap of the item "product code" in the ledger sheet is " . . . 10000010". This represents that data on the item "product code" in the ledger sheet of the first record is stored in the $1^{st}$ bit at a position "1" in the file 3. It is also represented that data on the item "product code" in the ledger sheet of the next record is stored in the $7^{th}$ bit at a position "7" in the file 3. Here, data on the item "product code" in the ledger sheet is stored in bits corresponding to positions "13", "22", "30", and "38".

A bitmap of the item "product name" in the ledger sheet is " . . . 100000100", and a bitmap of the item "unit price" in the ledger sheet is " . . . 100000100000". This represents that data on the item "product name" is stored in the $2^{nd}$ to $4^{th}$ bits at positions "2" to "4" in the file 3. It is also represented that data on the item "product name" is stored in the eighth to $10^{th}$ bits at positions "8" to "10" in the file 3. Here, data on the item "product name" in the ledger sheet is stored in bits corresponding to positions "14" to "19", "23" to "27", "31" to "35", and "39" to "42".

In the bitmap index for the word ID, positions and bits corresponding to the positions are allocated in order of word ID from the first record in the file 3. Then, the bit value of the bit corresponding to the position of the word ID is set to "1". When the position and the bit corresponding to the position are allocated to the last word ID for a certain record, a next position and a next bit corresponding to the position are allocated to the first word ID of the next record.

A bitmap for a word ID "A000h" (numerical value "2015/7/15") is " . . . 0001". This represents that the numerical value "2015/7/15" corresponding to the word ID "A000h" is stored in the $0^{th}$ bit and not stored in the other bits. A bitmap for a word ID "D000h" (character "Rei") is " . . . 0100". This represents that the character "Rei" corresponding to the word ID "D000h" is stored in the $2^{nd}$ bit and not stored in the other bits. A bitmap for a word ID "D001h" (character "Zou") is " . . . 1000". This represents that the character "Zou" corresponding to the word ID "D001h" is stored in the $3^{rd}$ bit and not stored in the other bits. A bitmap for a word ID "D002h" (character "Ko") is " . . . 10000". This represents that the character "Zou" corresponding to the word ID "D002h" is stored in the $4^{th}$ bit and not stored in the other bits.

As described above, the bitmap index is, for example, a bitmap transposed index in which items of a ledger sheet, positional information on word IDs in ledger sheet data, and the like are stored.

[Example of Hashed Index Generation Processing According to Example 1]

Figure 3:
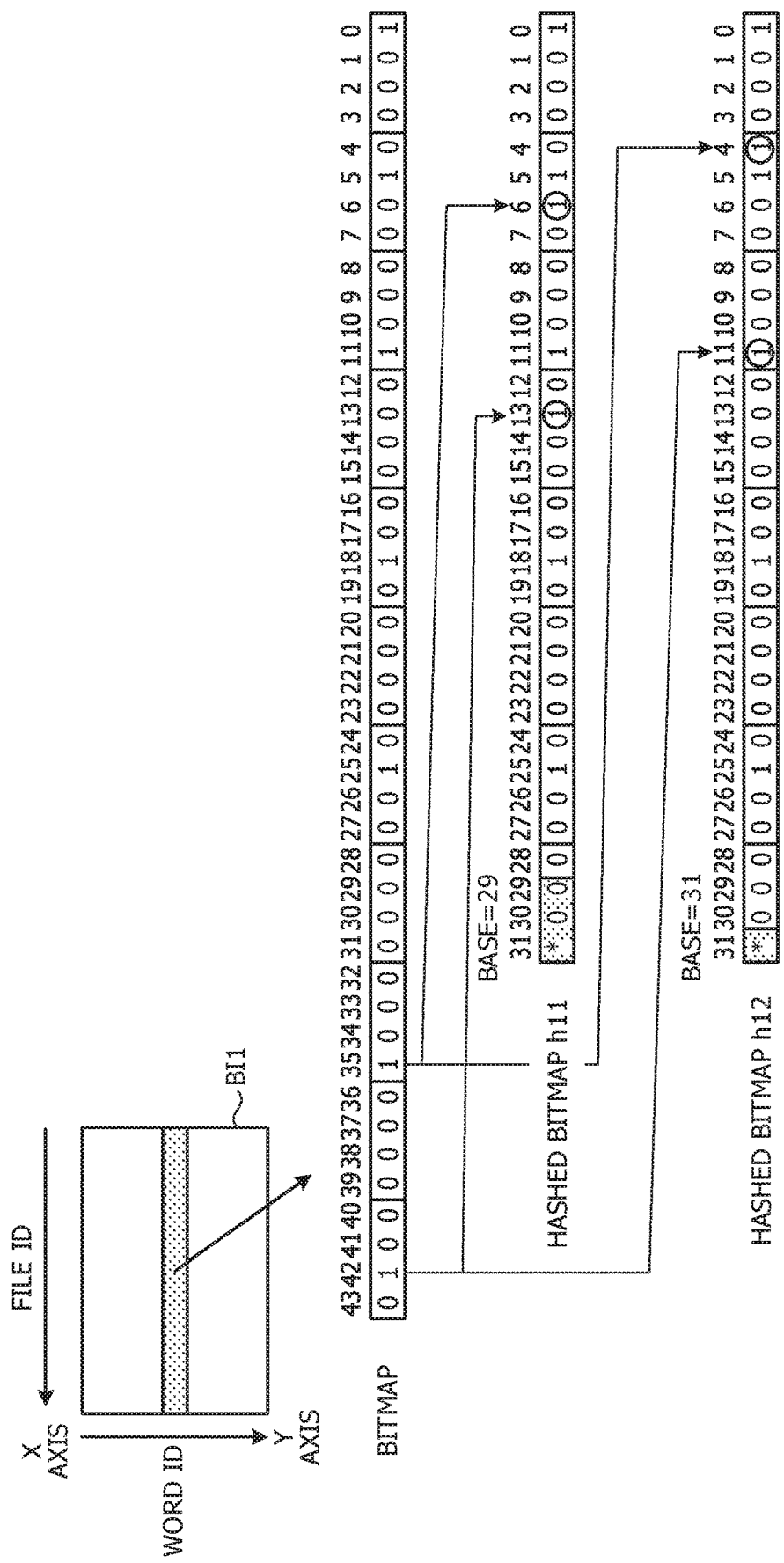
FIG. 3 is a diagram illustrating an example of hashed index generation processing according to Example 1.

Next, with reference to FIG. 3, description is given of an example of processing of hashing a bitmap in a bitmap side index. FIG. 3 is a diagram illustrating an example of hashed index generation processing according to Example 1. With reference to FIG. 3, description is given of, as an example, a case where a bitmap of the two-dimensional bitmap index BI1 is hashed with the X-axis representing the file ID and the Y-axis representing the word ID.

The ledger sheet output device generates a plurality of hashed bitmaps by applying a hash function to each bitmap corresponding to the word ID. Here, the ledger sheet output device hashes a bitmap of the two-dimensional bitmap index BI1 based on hash values (base) of 29 and 31, as an example, assuming a 43-bit register. To be more specific, for a hashed bitmap with one base, the ledger sheet output device sets the value of each bit in the bitmap at the position of a remainder when the position of each bit in the bitmap corresponding to the word ID is divided by the base. The position of each bit in the bitmap corresponds to each file ID. For a hashed bitmap h11 with the base 29, as an example, the ledger sheet output device sets the value of each bit of the bitmap at the position of a remainder when the position of each bit in the bitmap is divided by the base 29. The bit value "1" at the position of the $35^{th}$ bit in the bitmap is set in the $6^{th}$ bit of the hashed bitmap h11. The bit value "1" at the position of the $42^{nd}$ bit in the bitmap is set in the $13^{th}$ bit of the hashed bitmap h11. For a hashed bitmap h12 with the base 31, the ledger sheet output device sets the value of each bit of the bitmap at the position of a remainder when the position of each bit in the bitmap is divided by the base 31. The bit value "1" at the position of the $35^{th}$ bit in the bitmap is set in the $4^{th}$ bit of the hashed bitmap h12. The bit value "1" at the position of the $42^{nd}$ bit in the bitmap is set in the $11^{th}$ bit of the hashed bitmap h12. More specifically, the ledger sheet output device sequentially sets the respective bits starting from the $0^{th}$ bit of the bitmap in the bits of the hashed bitmap from the $0^{th}$ bit to the (base-1)$^{th}$ bit. Then, the ledger sheet output device sets a value obtained by performing an OR operation with the value already set in the hashed bitmap again from the $0^{th}$ bit of the bitmap. As a result, the ledger sheet output device generates the hashed bitmaps h11 and h12 for the bitmap. Thus, for the bitmap in the two-dimensional bitmap index BI1 for the word ID, the ledger sheet output device generates the hashed bitmaps h11 and h12. The ledger sheet output device generates a two-dimensional hashed index HI1 by putting together the generated hashed bitmaps h11 and h12.

As in the case of the bitmap in the two-dimensional bitmap index BI1, the ledger sheet output device generates a plurality of hashed bitmaps by applying a hash function to a bitmap in the first three-dimensional bitmap index BI2. Then, the ledger sheet output device generates a first three-dimensional hashed index HI2 by putting together the generated hashed bitmaps. Likewise, the ledger sheet output device also generates a second three-dimensional hashed index HI3 from the second three-dimensional bitmap index BI3. The following description is given on the assumption that the hash values (base) are 29 and 31 as an example.

[Configuration Example of Encoded File]

Figure 4:
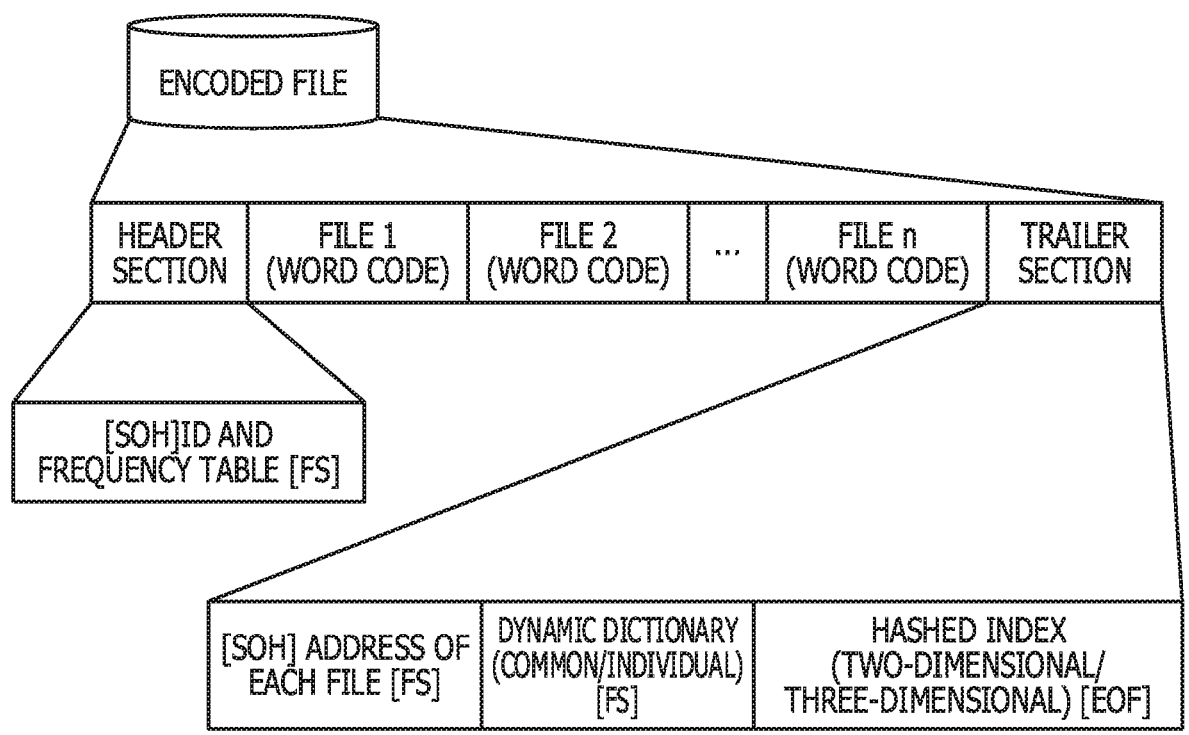
FIG. 4 is a diagram illustrating a configuration example of an encoded file.

FIG. 4 is a diagram illustrating a configuration example of an encoded file. As illustrated in FIG. 4, the encoded file has a header section, encoded data, and a trailer section. The encoded data stores an encoded word ID group for each of a plurality of files. The trailer section stores an address of each file, dynamic dictionary (common/individual) information, hashed index (two-dimensional/three-dimensional), and the like. The address of each file represents an address of a storage location of each encoded data obtained by encoding the plurality of files. The address of each file is, for example, a relative address from the beginning of the encoded data. The individual dynamic dictionary information corresponds to dynamic dictionary information for each of the plurality of files. The common dynamic dictionary information corresponds to dynamic dictionary information for all of the plurality of files. The header section stores a pointer to the address of each of the files stored in the trailer section, a pointer to the dynamic dictionary, and a pointer to the hashed index (two-dimensional/three-dimensional). After encoding the plurality of files, the ledger sheet output device stores the encoded data indicating the respective encoding results in the encoded files, and stores each of the stored addresses in the address of each file. In decoding processing, the pointer to the address of each file in the header section is used to refer to an address of a file to be decoded from the address of each file in the trailer section. In the decoding processing, the pointer to the dynamic dictionary in the header section is used to refer to the dynamic dictionary. In retrieval processing, the pointer to the address of each hashed index in the header section is used to refer to an address of a hashed index to be retrieved from the address of each hashed index in the trailer section.

[Example of Retrieval Processing According to Example 1]

FIG. 5 is a diagram illustrating an example of an image in which a retrieval target is entered. As illustrated in FIG. 5, "ledger sheet", "page", and "record" are selectable as a valid range of retrieval conditions in a retrieval device. The valid range of retrieval conditions represents a unit for retrieval. For example, when "ledge sheet" is selected, retrieval is performed by the ledger sheet. When "page" is selected, retrieval is performed by the page. When "all" is selected, retrieval is performed without specifying the unit for retrieval. The retrieval device may perform retrieval under three retrieval conditions, for example, as item conditions. Here, description is given of a case where "all" is selected as the valid range of retrieval conditions, "product name" is set as the retrieval condition, and "Reizouko" is entered as a retrieval target. Note that the retrieval conditions may be directly entered. When a Japanese word is entered as the retrieval target, a retrieval target string is broken down by character for retrieval.

Figure 6:
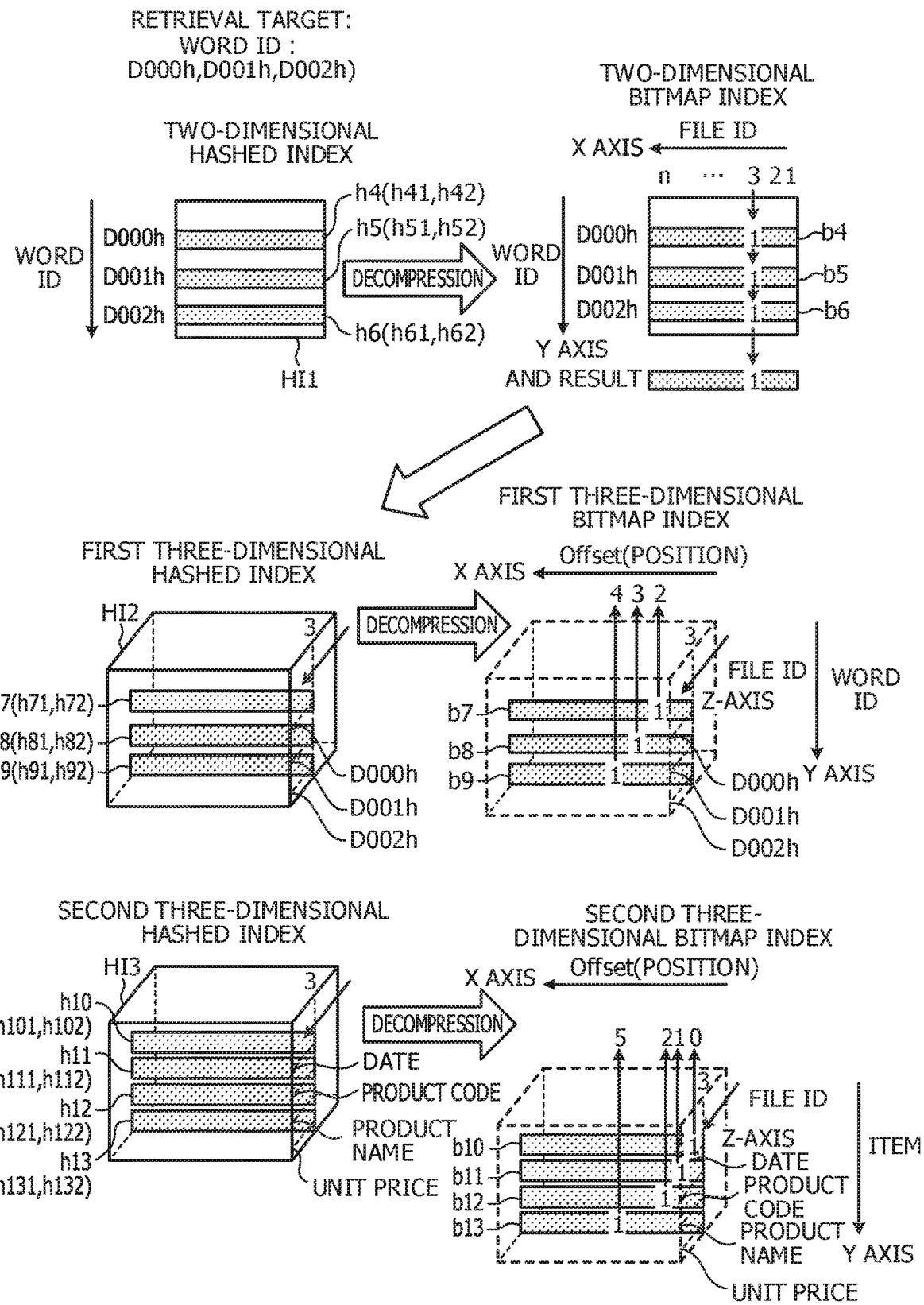
FIG. 6 is a diagram illustrating an example of retrieval processing according to Example 1.

FIG. 6 is a diagram illustrating an example of retrieval processing according to Example 1. As illustrated in FIG. 6, the retrieval device that executes the retrieval processing refers to the two-dimensional hashed index HI1 based on the entered retrieval target "Reizouko". The retrieval device acquires file IDs where word IDs corresponding to "Rei", "Zou", and "Ko" are present. Then, the retrieval device identifies positional information of the word IDs by specifying the word IDs and the file IDs in the first three-dimensional hashed index HI2. The retrieval device also identifies positional information of the item "product name" in the ledger sheet by specifying the retrieval condition "product name" and the file ID in the second three-dimensional hashed index HI3.

An example of the retrieval processing is described in detail below. Upon receipt of a retrieval target string entered, the retrieval device refers to the two-dimensional hashed index HI1 to extract a hashed bitmap for the word ID indicated by the received retrieval target. The retrieval device breaks down "Reizouko" received as the retrieval target into "Rei", "Zou", and "Ko", and retrieves a word ID corresponding to each of the characters. The retrieval device retrieves the word ID "D000h" corresponding to "Rei". The retrieval device retrieves the word ID "D001h" corresponding to "Zou". The retrieval device retrieves the word ID "D002h" corresponding to "Ko". Then, the retrieval device extracts a hashed bitmap h4 for the word ID "D000h" from the two-dimensional hashed index HI1. The hashed bitmap h4 includes a hashed bitmap h41 for the base 29 and a hashed bitmap h42 for the base 31. The retrieval device extracts a hashed bitmap h5 for the word ID "D001h" from the two-dimensional hashed index HI1. The hashed bitmap h5 includes a hashed bitmap h51 for the base 29 and a hashed bitmap h52 for the base 31. The retrieval device extracts a hashed bitmap h6 for the word ID "D002h" from the two-dimensional hashed index HI1. The hashed bitmap h6 includes a hashed bitmap h61 for the base 29 and a hashed bitmap h62 for the base 31.

The retrieval device decompresses the extracted hashed bitmap for each word ID. Note that this decompression processing for the hashed bitmaps is described later. The result of decompression is represented by a bitmap corresponding to the word ID. Here, the retrieval device decompresses the hashed bitmap h4 for the word ID "D000h" and outputs a bitmap b4 as a decompression result. The retrieval device decompresses the hashed bitmap h5 for the word ID "D001h" and outputs a bitmap b5 as a decompression result. The retrieval device decompresses the hashed bitmap h6 for the word ID "D002h" and outputs a bitmap b6 as a decompression result.

The retrieval device also performs an AND operation for the bitmap b4 of the word ID "D000h", the bitmap b5 of the word ID "D001h", and the bitmap b6 of the word ID "D002h". The retrieval device outputs a file ID for which the bit of the AND result is ON ("1"). More specifically, the retrieval device narrows down the file ID of the file including "Rei" indicated by the word ID "D000h", "Zou" indicated by the word ID "D001h", and "Ko" indicated by the word ID "D002h". Here, "3" is outputted as the file ID.

After narrowing down the file ID, the retrieval device refers to the first three-dimensional hashed index HI2 to extract a word ID and a hashed bitmap for the file ID. Here, the retrieval device extracts the word ID "D000h" and a hashed bitmap h7 for the file ID "3" from the first three-dimensional hashed index HI2. The hashed bitmap h7 includes a hashed bitmap h71 for the base 29 and a hashed bitmap h72 for the base 31. The retrieval device also extracts the word ID "D001h" and a hashed bitmap h8 for the file ID "3" from the first three-dimensional hashed index HI2. The hashed bitmap h8 includes a hashed bitmap h81 for the base 29 and a hashed bitmap h82 for the base 31. The retrieval device also extracts the word ID "D002h" and a hashed bitmap h9 for the file ID "3" from the first three-dimensional hashed index HI2. The hashed bitmap h9 includes a hashed bitmap h91 for the base 29 and a hashed bitmap h92 for the base 31.

The retrieval device decompresses the extracted hashed bitmaps h7 to h9. The result of decompression is represented by the word ID and a bitmap corresponding to the file ID. Here, the retrieval device decompresses the hashed bitmap h7 for the word ID "D000h" and the file ID "3" and outputs a bitmap b7 as a decompression result. The retrieval device decompresses the hashed bitmap h8 for the word ID "D001h" and the file ID "3" and outputs a bitmap b8 as a decompression result. The retrieval device decompresses the hashed bitmap h9 for the word ID "D002h" and the file ID "3" and outputs a bitmap b9 as a decompression result.

Then, the retrieval device specifies Offset (position) where the bits in the bitmaps b7 to b9 outputted as the decompression results indicate ON ("1"). For example, the retrieval device specifies Offset (position) with the bit value "1" in the bitmap b7 having the file ID "3" and the word ID "D000h". Here, Offset (position) "2" is specified. The retrieval device also specifies Offset (position) with the bit value "1" in the bitmap b8 having the file ID "3" and the word ID "D001h". Here, Offset (position) "3" is specified. The retrieval device also specifies Offset (position) with the bit value "1" in the bitmap b9 having the file ID "3" and the word ID "D002h". Here, Offset (position) "4" is specified.

Figure 7:
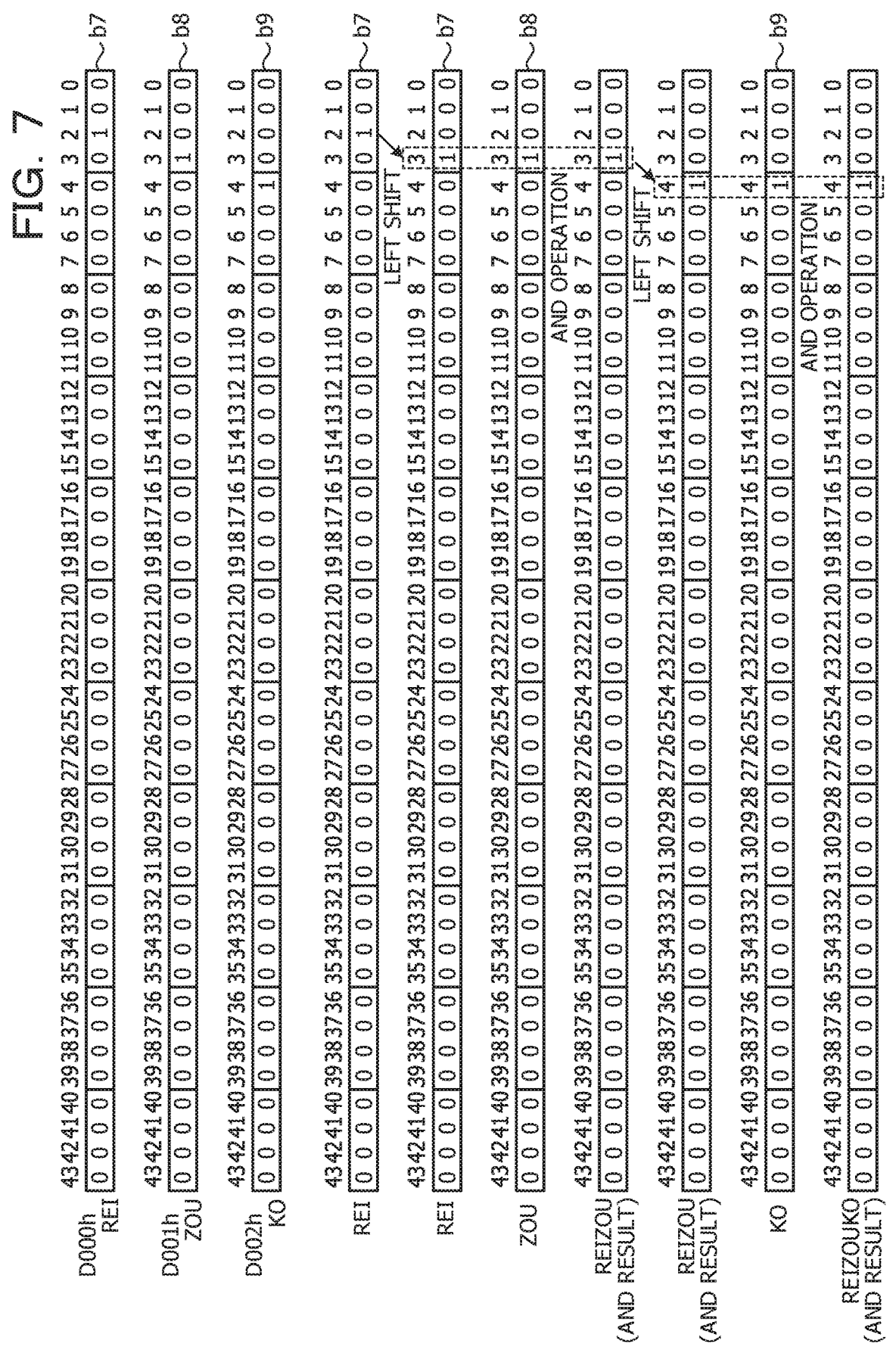

The retrieval device determines, based on the specified Offset (position), whether or not the retrieval target string is included in the file. FIG. 7 is a diagram illustrating an example of string determination processing according to Example 1.

For example, as illustrated in FIG. 7, once Offset (position) is specified for the word IDs "D000h", "D001h", and "D002h", the retrieval device places the bitmaps b7 to b9 of the word IDs according to the retrieval target string. Here, since the retrieval target string is "Reizouko", the retrieval device places the bitmap b7, the bitmap b8, and the bitmap b9 in this order. Then, the retrieval device shifts the bit having the bit value "1" in the bitmap b7 of "Rei" that is the first character of the retrieval target string by 1 to the left. Thus, the $3^{rd}$ bit is set to "1" in the bitmap b7 of "Rei". Then, the retrieval device performs an AND operation for the shifted bitmap b7 of "Rei" and the bitmap b8 of the next character "Zou". When the result of the AND operation is "1", the retrieval device shifts the bit having the bit value "1" in the bitmap of the AND result by 1 to the left. Thus, the $4^{th}$ bit is set to "1" in the bitmap of the AND result. Then, the retrieval device performs an AND operation for the shifted bitmap of the AND result and the bitmap b9 of the further next character "Ko". When the result of the AND operation is "1", the retrieval device determines that the retrieval target is included in the file. Note that, when any of the results of the AND operations is "0", the retrieval device determines that the retrieval target is not included in the file.

Thus, by combining the AND operations and shifting of bits, the retrieval device determines whether or not the retrieval target is included in the file.

Referring back to FIG. 6, the retrieval device refers to the second three-dimensional hashed index HI3, after narrowing down the file ID, to extract a hashed bitmap for the ledger sheet item included in the file ID. Here, the retrieval device extracts a hashed bitmap for the ledger sheet item included in the file ID "3" from the second three-dimensional hashed index HI3. The retrieval device extracts hashed bitmaps h10 to h13 corresponding to the ledger sheet items "date", "product code", "product name", "unit price", and the like included in the file 3 from the second three-dimensional hashed index HI3. The hashed bitmap h10 includes a hashed bitmap h101 for the base 29 and a hashed bitmap h102 for the base 31. The hashed bitmap h11 includes a hashed bitmap h111 for the base 29 and a hashed bitmap h112 for the base 31. The hashed bitmap h12 includes a hashed bitmap h121 for the base 29 and a hashed bitmap h122 for the base 31. The hashed bitmap h13 includes a hashed bitmap h131 for the base 29 and a hashed bitmap h132 for the base 31.

The retrieval device decompresses the extracted hashed bitmaps h10 to h13. The result of decompression is represented by the file ID and a bitmap corresponding to the ledger sheet item. Here, the retrieval device decompresses the hashed bitmaps h10 to h13 and outputs bitmaps b10 to b13 as decompression results.

Then, the retrieval device specifies Offset (position) where the bits in the bitmaps b10 to b13 outputted as the decompression results indicate ON ("1"). For example, the retrieval device specifies Offset (position) with the bit value "1" in the bitmap b10 having the file ID "3" and the ledger sheet item "date". Here, Offset (position) "0" is specified, for example. Likewise, for the respective ledger sheet items, the retrieval device specifies Offset (position) with the bit value "1" in the bitmaps b11 to b13.

Figure 8:
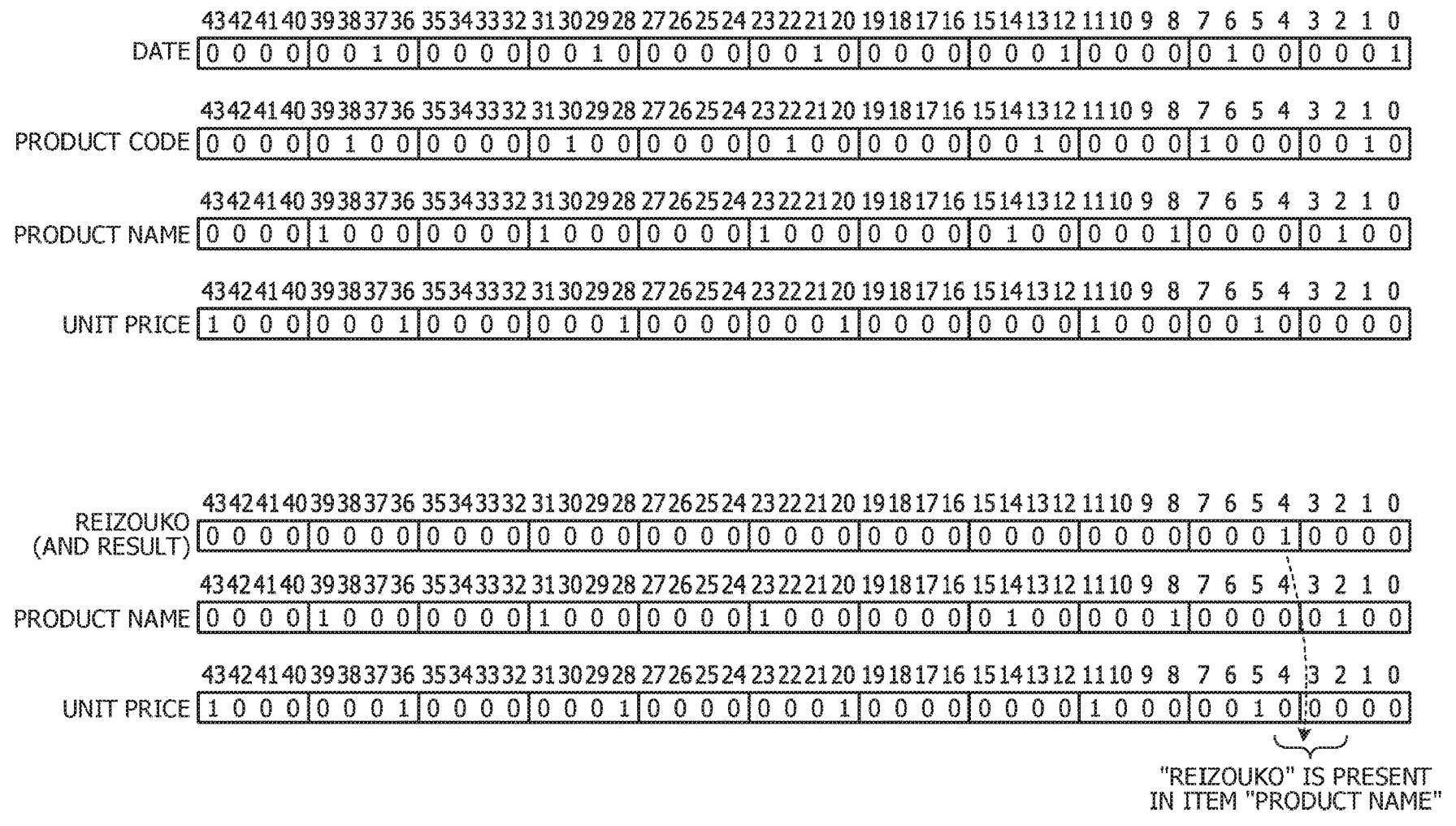

Then, based on the specified Offset (position), the retrieval device determines whether or not the retrieval target string is included in the retrieval condition item. FIG. 8 is a diagram illustrating an example of retrieval condition determination processing according to Example 1.

Here, based on the specified Offset (position) of the ledger sheet item and the AND operation result for "Reizouko" described with reference to FIG. 7, the retrieval device performs retrieval condition determination processing. The retrieval device determines whether or not Offset (position) with the bit value "1" in the final AND result bitmap in FIG. 7 is included in the item "product name" selected as the retrieval condition. In the final AND result bitmap, the $4^{th}$ bit has the bit value "1". The $2^{nd}$ bit is "1" in the bitmap of the item "product name", and the $5^{th}$ bit is "1" in the bitmap of the item "unit price". Therefore, it may be seen that the characters included in the item "product name" are stored in the $2^{nd}$ to $4^{th}$ bits in the bitmaps. In the final AND result bitmap, the $4^{th}$ bit is "1". Thus, the retrieval device determines that the retrieval target string "Reizouko" is present in the item "product name" in the file 3. Note that, when the position where the bit value is "1" in the final AND result bitmap, for example, is the $1^{st}$ bit or the $5^{th}$ bit, the retrieval device determines that the retrieval target string "Reizouko" is not present in the item "product name".

The retrieval device outputs, for example, a file name including the string "Reizouko" in the ledger sheet item "product name". Note that the retrieval device may display the file name including the string "Reizouko" in the ledger sheet item "product name" and strings before and after "Reizouko". Thus, the retrieval device retrieves the retrieval target string that satisfies the retrieval condition, and outputs the retrieval result. Accordingly, the retrieval device may quickly output the retrieval result on the retrieval target string.

[Example of Hashed Bitmap Decompression Processing According to Example 1]

Figure 9:
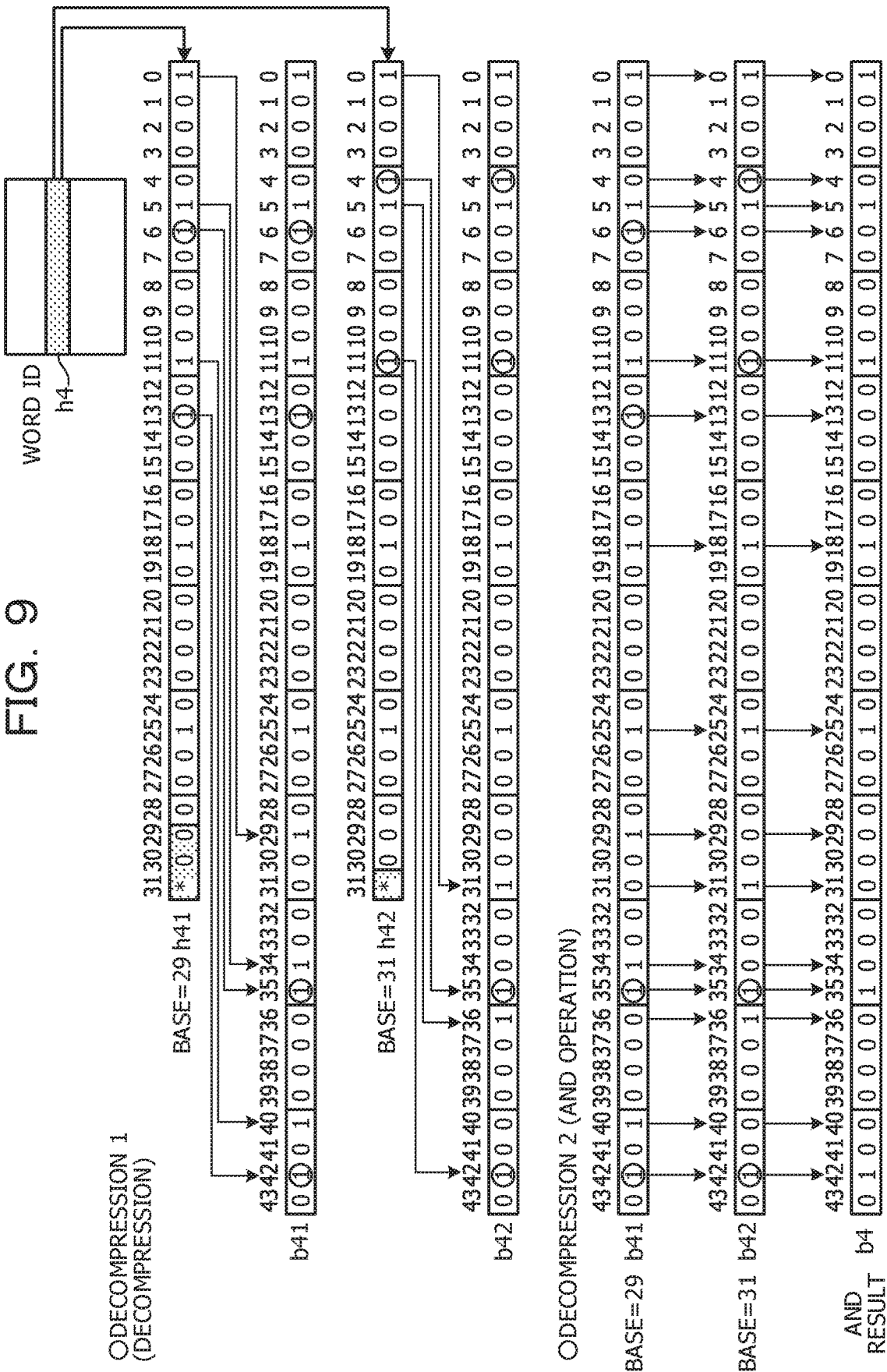
FIG. 9 is a diagram illustrating an example of hashed bitmap decompression processing according to Example 1.

Next, with reference to FIG. 9, description is given of an example of processing of decompressing a hashed bitmap. FIG. 9 is a diagram illustrating an example of hashed bitmap decompression processing according to Example 1. Here, description is given of, as an example, decompressing the hashed bitmap h4.

The retrieval device decompresses the hashed bitmaps h41 and h42 included in the hashed bitmap h4 into bitmaps (Decompression 1). Here, as for a decompression target bitmap of a hashed bitmap with one base, the retrieval device sets the value of each bit of the hashed bitmap at a position obtained by adding the position of each bit of the hashed bitmap to the value obtained by multiplying the base by an integer (not less than 0). As an example, for a decompression target bitmap b41 of the hashed bitmap h41 with the base 29, the retrieval device sets the value of each bit of the hashed bitmap h41 at a position obtained by adding the position of each bit of the hashed bitmap h41 to the value obtained by multiplying the base 29 by "0". For the decompression target bitmap b41 of the hashed bitmap h41 with the base 29, the retrieval device sets the value of each bit of the hashed bitmap h41 at a position obtained by adding the position of each bit of the hashed bitmap h41 to the value obtained by multiplying the base 29 by "1". The retrieval device repeats this processing until the bit value is set at the maximum bit position in the decompression target bitmap b41 with the base 29. Likewise, for a decompression target bitmap b42 of the hashed bitmap h42 with the base 31, the retrieval device sets the value of each bit of the hashed bitmap h42 at a position obtained by adding the position of each bit of the hashed bitmap h42 to the value obtained by multiplying the base 31 by "0". For the decompression target bitmap b42 of the hashed bitmap h42 with the base 31, the retrieval device sets the value of each bit of the hashed bitmap h42 at a position obtained by adding the position of each bit of the hashed bitmap h42 to the value obtained by multiplying the base 31 by "1". The retrieval device repeats this processing until the bit value is set at the maximum bit position in the decompression target bitmap b42.

Then, the retrieval device performs an AND operation of the bits at the positions corresponding to the respective decompressed bitmaps (Decompression 2). Here, the retrieval device performs an AND operation of the bitmap b41 decompressed from the hashed bitmap h41 with the base 29 and the bitmap b42 decompressed from the hashed bitmap h42 with the base 31. Then, the retrieval device outputs the bitmap b4 of the AND result as the decompression result.

Note that the retrieval device also decompresses the hashed bitmaps of the first three-dimensional hashed index HI2 in the same manner as the hashed bitmaps of the two-dimensional hashed index HI1. Also, the retrieval device decompresses the hashed bitmaps of the second three-dimensional hashed index HI3 in the same manner as the hashed bitmaps of the two-dimensional hashed index HI1.

[Configuration of Ledger Sheet Output Device According to Example 1]

Figure 10:
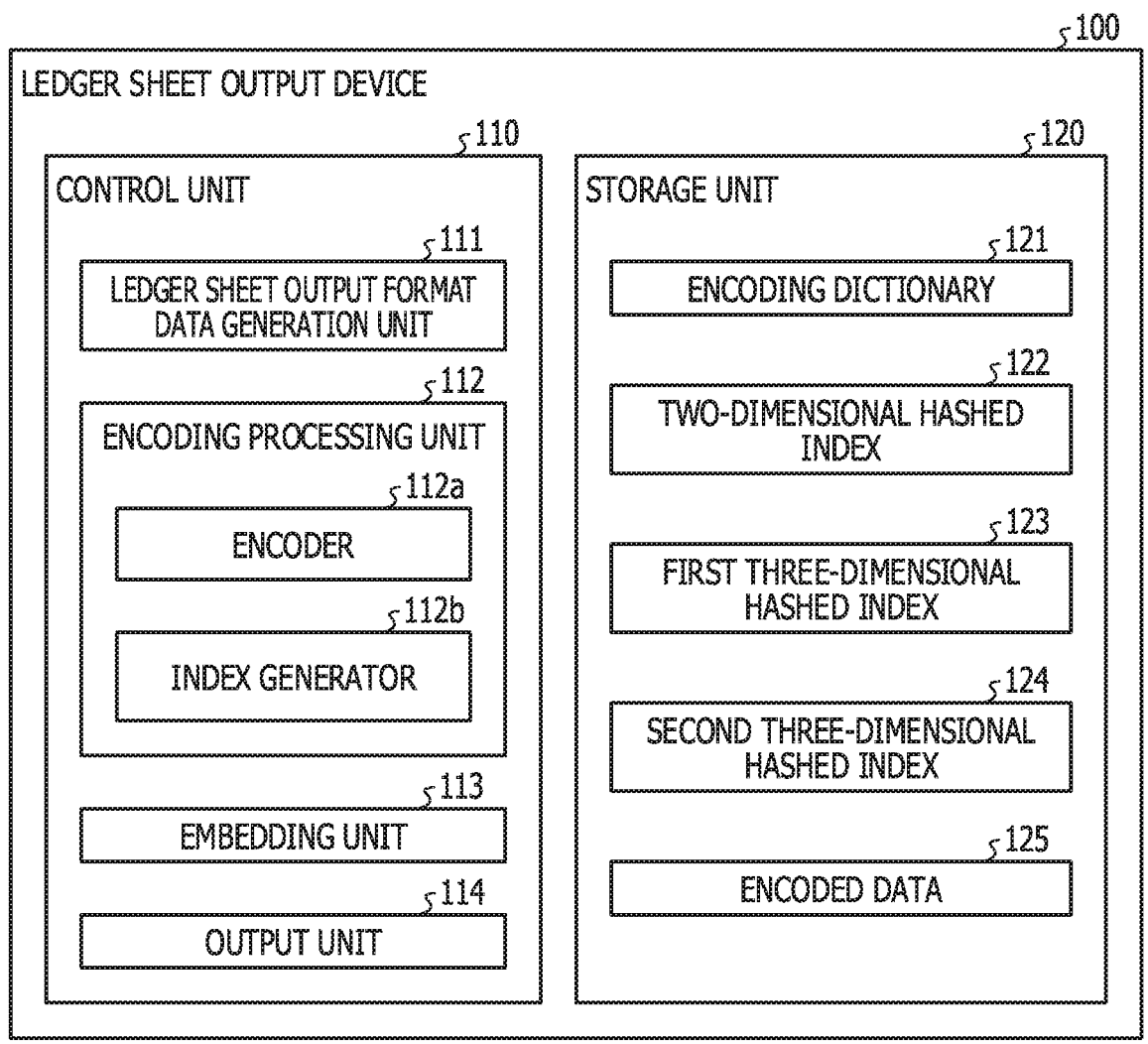
FIG. 10 is a functional block diagram illustrating a configuration of a ledger sheet output device according to Example 1.

Next, with reference to FIG. 10, description is given of a configuration of a ledger sheet output device 100 according to Example 1. FIG. 10 is a functional block diagram illustrating the configuration of the ledger sheet output device 100 according to Example 1. As illustrated in FIG. 10, the ledger sheet output device 100 includes a control unit 110 and a storage unit 120.

The control unit 110 is a processing unit that executes the index generation processing illustrated in FIG. 1. The control unit 110 includes an internal memory for storing programs and control data that specify various processing procedures, and executes various kinds of processing according to those procedures. The control unit 110 corresponds to, for example, an integrated electronic circuit such as an ASIC and an FPGA. Alternatively, the control unit 110 corresponds to an electronic circuit such as a CPU and an MPU. The control unit 110 also includes a ledger sheet output format data generation unit 111, an encoding processing unit 112, an embedding unit 113, and an output unit 114.

The storage unit 120 corresponds to, for example, a storage unit such as a non-volatile semiconductor memory device such as a flash memory and an FRAM (registered trademark). The storage unit 120 includes an encoding dictionary 121, a two-dimensional hashed index 122, a first three-dimensional hashed index 123, a second three-dimensional hashed index 124, and encoded data 125.

The ledger sheet output format data generation unit 111 retrieves a file to be encoded into a storage area. The ledger sheet output format data generation unit 111 generates ledger sheet output format data from ledger sheet data included in the retrieved file. The ledger sheet output format data generation unit 111 outputs the generated ledger sheet output format data to the encoding processing unit 112. Note that the ledger sheet output format data generation unit 111 extracts page information of the ledger sheet data from the ledger sheet data. For example, the ledger sheet output format data generation unit 111 retrieves a definition file, before generating the ledger sheet output format data, to extract the page information. Alternatively, the ledger sheet output format data generation unit 111 may extract the page information, for example, through the process of generating the ledger sheet output format data. Note that, for example, the ledger sheet output format data generation unit 111 adds the page information to the ledger sheet output format data. Alternatively, for example, the ledger sheet output format data generation unit 111 may output the page information separately from the ledger sheet output format data.

The encoding processing unit 112 includes an encoder 112a and an index generator 112b. The encoder 112a generates the encoded data 125 by encoding a string included in the ledger sheet output format data based on the encoding dictionary 121. The encoder 112a determines whether or not the string included in the ledger sheet output format data is registered in a static dictionary. As an example, the encoder 112a determines whether or not the string hits a bit filter of the static dictionary. When the string is registered in the static dictionary, the encoder 112a encodes the string based on the static dictionary. As an example, the encoder 112a encodes the string into a static code (word ID) corresponding to the string, based on the static dictionary. The encoder 112a outputs the encoded word ID to the index generator 112b.

When the string is not registered in the static dictionary, the encoder 112a encodes the string based on a dynamic dictionary. As an example, the encoder 112a determines whether or not the string is stored in a buffer section of the dynamic dictionary. When the string is not stored in the buffer section of the dynamic dictionary, the encoder 112a stores the string in the buffer section and also stores a storage location where the string is stored and a stored data length in an address table. The encoder 112a encodes the string into a dynamic code (word ID) in the address table, which is associated with the string. On the other hand, when the string is stored in the buffer section of the dynamic dictionary, the encoder 112a encodes the string into a dynamic code (word ID) corresponding to the string. The encoder 112a outputs information including the encoded word ID and the position of the string indicated by the word ID to the index generator 112b.

Based on the file ID of the file and the encoded word ID, the index generator 112b generates the two-dimensional hashed index 122. For example, the index generator 112b receives the information outputted from the encoder 112a. Based on the received information, the index generator 112b generates a bitmap corresponding to the file ID of the file with the word ID present therein. For the generated bitmap, the index generator 112b generates hashed bitmaps using a base α and a base β. More specifically, the index generator 112b sets the presence or absence of the string indicated by the word ID, for the file, in the two-dimensional hashed index 122.

As an example, the index generator 112b generates hashed bit maps based on two hash values (bases) for each bitmap corresponding to the word ID. More specifically, the index generator 112b sequentially sets the respective bits starting from the $0^{th}$ bit of the bitmap in the bits of the hashed bitmap from the $0^{th}$ bit to the $(base-1)^{th}$ bit. Then, the index generator 112b sets a value obtained by performing an OR operation with the value already set in the hashed bitmap again from the $0^{th}$ bit of the hashed bitmap. After generating hashed bitmaps for the bitmaps corresponding to all the word IDs, the index generator 112b stores the two-dimensional hashed index 122 by putting together the generated hashed bitmaps, in the storage unit 120.

The index generator 112b also generates the first three-dimensional hashed index 123 based on the file ID of the file, the encoded word ID, and the position of the string indicated by the word ID. For example, based on the received information, the index generator 112b generates a bitmap corresponding to the file ID of the file with the word ID present therein and the position of the word ID in the file. For the generated bitmap, the index generator 112b generates hashed bitmaps using the bases α and β. More specifically, the index generator 112b sets the word ID and the position of the string indicated by the word ID, for the file (ledger sheet data), in the first three-dimensional hashed index 123.

The index generator 112b also generates the second three-dimensional hashed index 124 based on the file ID of the file, the ledger sheet item, and the position of the ledger sheet item. For example, based on the received information, the index generator 112b generates a bitmap corresponding to the file ID of the file with the word ID present therein and the position of the ledger sheet item. For the generated bitmap, the index generator 112b generates hashed bitmaps using the bases α and β. More specifically, the index generator 112b sets the ledger sheet item and the position of the ledger sheet item in the ledger sheet data, for the file (ledger sheet data), in the second three-dimensional hashed index 124.

Note that a method for generating the first three-dimensional hashed index 123 and the second three-dimensional hashed index 124 is the same as that described for the two-dimensional hashed index 122, and thus description thereof is omitted. The index generator 112b stores the generated first three-dimensional hashed index 123 and second three-dimensional hashed index 124 in the storage unit 120.

The embedding unit 113 generates an output file by embedding the encoded file including the dynamic dictionary in the encoding dictionary 121, the encoded data 125, and the index information including the hashed indexes 122 to 124 into a ledger sheet file. Thus, an indexed ledger sheet file is generated. For example, when the ledger sheet file is a PDF file, the embedding unit 113 embeds the encoded file into an extended region of the PDF file. Alternatively, when the ledger sheet file is, for example, a uniquely compressed file of a ledger sheet product, the embedding unit 113 generates an output file by compressing the encoded file together with a ledger sheet definition body and the like.

Figure 12:
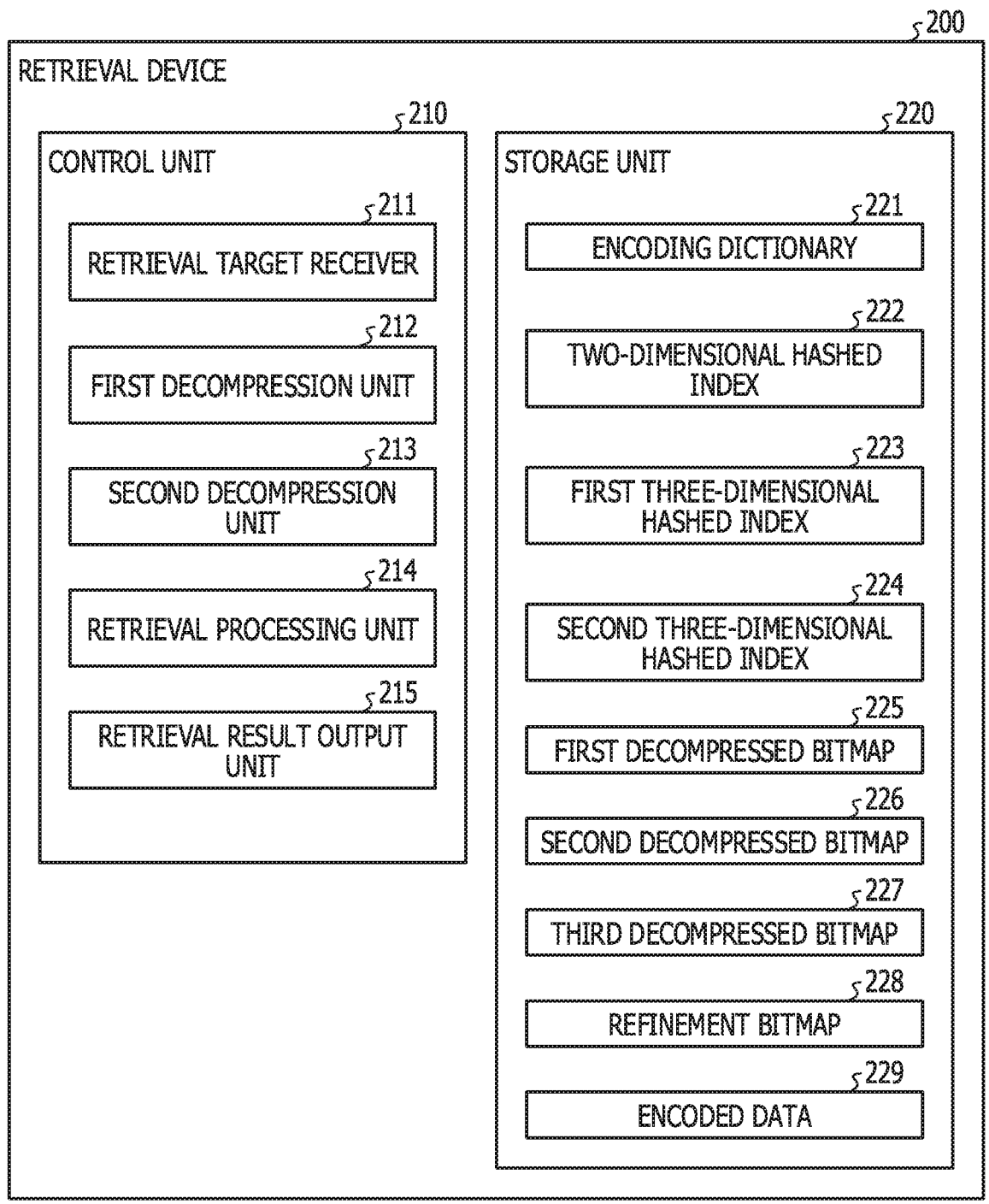
FIG. 12 is a functional block diagram illustrating a configuration of a retrieval device according to Example 1.

The output unit 114 transfers the output file, for example, to the retrieval device 200 (see FIG. 12).

[Procedures of Ledger Sheet File Generation Processing According to Example 1]

Figure 11:
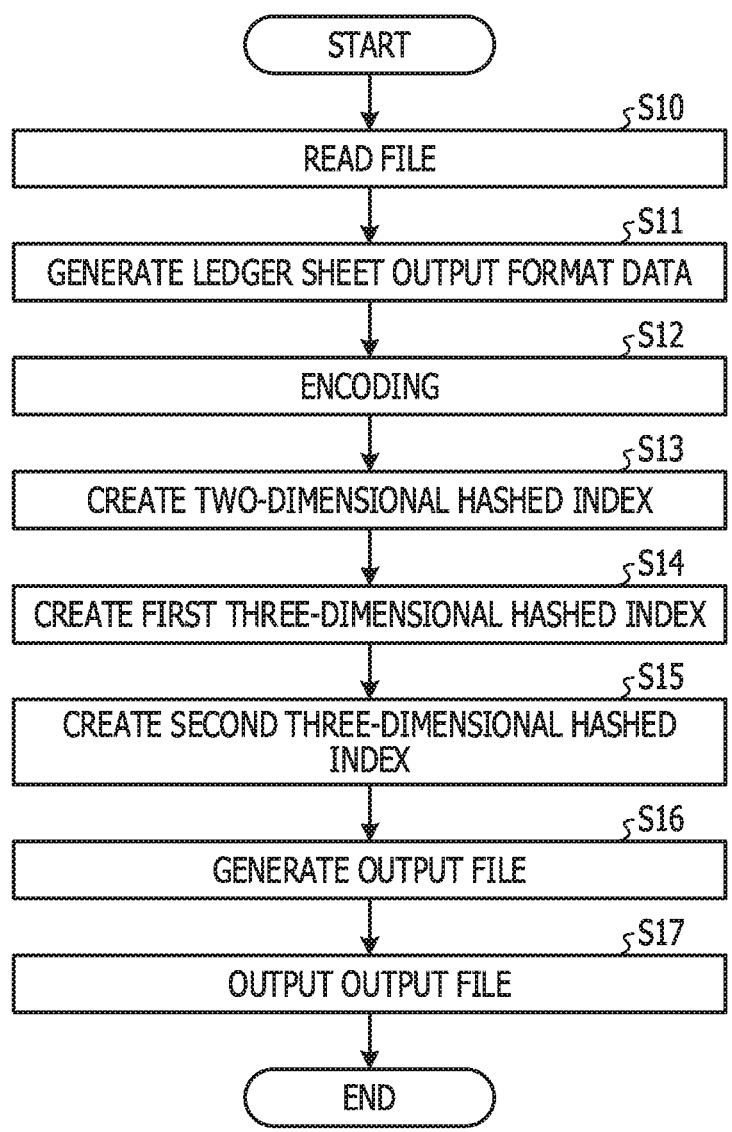
FIG. 11 is a diagram illustrating an example of a flowchart of ledger sheet file generation processing according to Example 1.

Next, with reference to FIG. 11, description is given of procedures of ledger sheet file generation processing according to Example 1. FIG. 11 is a diagram illustrating an example of a flowchart of the ledger sheet file generation processing according to Example 1. A ledger sheet file is an indexed ledger sheet file.

The ledger sheet output format data generation unit 111 retrieves a file to be encoded into a storage area (S10). The ledger sheet output format data generation unit 111 generates ledger sheet output format data from ledger sheet data included in the retrieved file (S11).

The encoder 112a encodes a string in the ledger sheet output format data into a word ID based on the encoding dictionary 121 (S12). Note that, when the string is not stored in the encoding dictionary 121 (static dictionary and dynamic dictionary), the encoder 112a encodes a new string and stores the string in the dynamic dictionary.

The index generator 112b generates a two-dimensional hashed index 122 based on the file ID of the file and the word ID (S13). The index generator 112b generates a first three-dimensional hashed index 123 based on the file ID of the file, the word ID, and the position of the word ID in the file (S14). The index generator 112b generates a second three-dimensional hashed index 124 based on the file ID of the file, the ledger sheet item, and the position of the ledger sheet item in the file (S15).

The embedding unit 113 generates an output file by embedding the dynamic dictionary in the encoding dictionary 121 and the encoded file including the hashed indexes 122 to 124 into a ledger sheet file (S16).

The output unit 114 outputs the generated output file, for example, to the retrieval device 200 (see FIG. 12) (S17).

[Configuration of Retrieval Device According to Example 1]

Net, with reference to FIG. 12, description is given of a configuration of the retrieval device 200 that executes retrieval processing according to Example 1. FIG. 12 is a functional block diagram illustrating the configuration of the retrieval device 200 according to Example 1. As illustrated in FIG. 12, the retrieval device 200 includes a control unit 210 and a storage unit 220.

The control unit 210 is a processing unit that executes the retrieval processing illustrated in FIGS. 6 to 8. The control unit 210 includes an internal memory for storing programs and control data that specify various processing procedures, and executes various kinds of processing according to those procedures. The control unit 210 corresponds to, for example, an integrated electronic circuit such as an ASIC and an FPGA. Alternatively, the control unit 210 corresponds to an electronic circuit such as a CPU and an MPU. The control unit 210 also includes a retrieval target receiver 211, a first decompression unit 212, a second decompression unit 213, a retrieval processing unit 214, and a retrieval result output unit 215.

The storage unit 220 corresponds to, for example, a storage unit such as a non-volatile semiconductor memory device such as a flash memory and an FRAM (registered trademark). The storage unit 220 includes an encoding dictionary 221, a two-dimensional hashed index 222, a first three-dimensional hashed index 223, a second three-dimensional hashed index 224, a first decompressed bitmap 225, a second decompressed bitmap 226, a third decompressed bitmap 227, a refinement bitmap 228, and encoded data 229. The first decompressed bitmap 225 is a bitmap in which the two-dimensional hashed index 222 is decompressed. The second decompressed bitmap 226 is a bitmap in which the first three-dimensional hashed index 223 is decompressed. The third decompressed bitmap 227 is a bitmap in which the second three-dimensional hashed index 224 is decompressed. The refinement bitmap 228 is a bitmap obtained as an AND result of an AND operation performed on the second decompressed bitmap 226 when a retrieval target is a string expressed with a plurality of word IDs. The AND bitmap corresponds to the bitmap representing "Reizouko" as the AND result in FIG. 7, for example.

The retrieval target receiver 211 receives a retrieval target. For example, the retrieval target receiver 211 displays an input image as illustrated in FIG. 5 to receive a retrieval condition and a retrieval target string.

The first decompression unit 212 extracts a hashed bitmap from the two-dimensional hashed index 222 corresponding to a word ID indicated by the retrieval target string. The first decompression unit 212 decompresses the extracted hashed bitmap and stores the decompressed first decompressed bitmap 225 in the storage unit 220. When the retrieval target includes a string expressed with a plurality of word IDs, the first decompression unit 212 extracts a plurality of hashed bitmaps from a plurality of two-dimensional hashed indexes 222 corresponding to the respective word IDs. Then, the first decompression unit 212 decompresses the respective hashed bitmaps, and stores the plurality of decompressed bitmaps as the first decompressed bitmaps 225 in the storage unit 220.

The first decompression unit 212 extracts a file ID including all retrieval target strings from the first decompressed bitmap 225. For example, when there is more than one first decompressed bitmap 225, the first decompression unit 212 performs an AND operation of the first decompressed bitmaps 225 as illustrated in FIG. 6. The first decompression unit 212 extracts a file ID with a bit value "1" as a result of the AND operation. The first decompression unit 212 outputs the extracted file ID to the second decompression unit 213.

The second decompression unit 213 extracts a hashed bitmap from the first three-dimensional hashed index 223 corresponding to the file ID and the word ID indicated by the retrieval target string. The second decompression unit 213 decompresses the extracted hashed bitmap and stores the decompressed second decompressed bitmap 226 in the storage unit 220. When the retrieval target includes a string expressed with a plurality of word IDs, the second decompression unit 213 extracts a plurality of hashed bitmaps from a plurality of first three-dimensional hashed indexes 223 corresponding to the respective word IDs. Then, the second decompression unit 213 decompresses the respective hashed bitmaps, and stores the plurality of decompressed bitmaps as the second decompressed bitmaps 226 in the storage unit 220.

The second decompression unit 213 also extracts a hashed bitmap from the second three-dimensional hashed index 224 corresponding to the file ID and the ledger sheet item. The second decompression unit 213 decompresses the extracted hashed bitmap and stores the decompressed third decompressed bitmap 227 in the storage unit 220.

The retrieval processing unit 214 retrieves a file including a retrieval target string and the position of the retrieval target string. For example, the retrieval processing unit 214 extracts Offset (position) with the bit value representing "1", based on the second decompressed bitmap 226. When the retrieval target includes a string expressed with a plurality of word IDs, the retrieval processing unit 214 extracts Offset (position) with the bit value representing "1" for each second decompressed bitmap 226. Then, the retrieval processing unit 214 compares the word ID sequence, that is, the string sequence with the Offset (position) sequence with the bit value representing "1". More specifically, the retrieval processing unit 214 determines whether or not a positional relationship between strings in the retrieval target matches a positional relationship between the word IDs with the bit value "1". For example, the retrieval processing unit 214 combines the AND operation and shifting of bits, as illustrated in FIG. 7, in the second decompressed bitmap 226 to determine whether or not the positional relationship between the strings in the retrieval target matches the positional relationship between the word IDs. When the positional relationship between the strings in the retrieval target matches the positional relationship between the word IDs, the retrieval processing unit 214 stores a final AND result bitmap as the refinement bitmap 228 in the storage unit 220.

The retrieval processing unit 214 also retrieves a retrieval target that satisfies a retrieval condition. For example, when a retrieval condition is selected under the item condition illustrated in FIG. 5, the retrieval processing unit 214 retrieves a retrieval target that satisfies the retrieval condition based on the third decompressed bitmap 227 and the refinement bitmap 228. For example, when Offset (position) with the bit value "1" in the refinement bitmap 228 is included in Offset (position) indicating the retrieval condition item in the third decompressed bitmap 227, the retrieval processing unit 214 determines that the retrieval condition is satisfied. Thus, the retrieval processing unit 214 retrieves the retrieval target that satisfies the retrieval condition.

The retrieval result output unit 215 outputs the retrieval result obtained by the retrieval processing unit 214. As for the file that satisfies the retrieval condition and includes the retrieval target string, the retrieval result output unit 215 outputs, for example, the file name.

[Procedures of Retrieval Processing According to Example 1]

Figure 13:
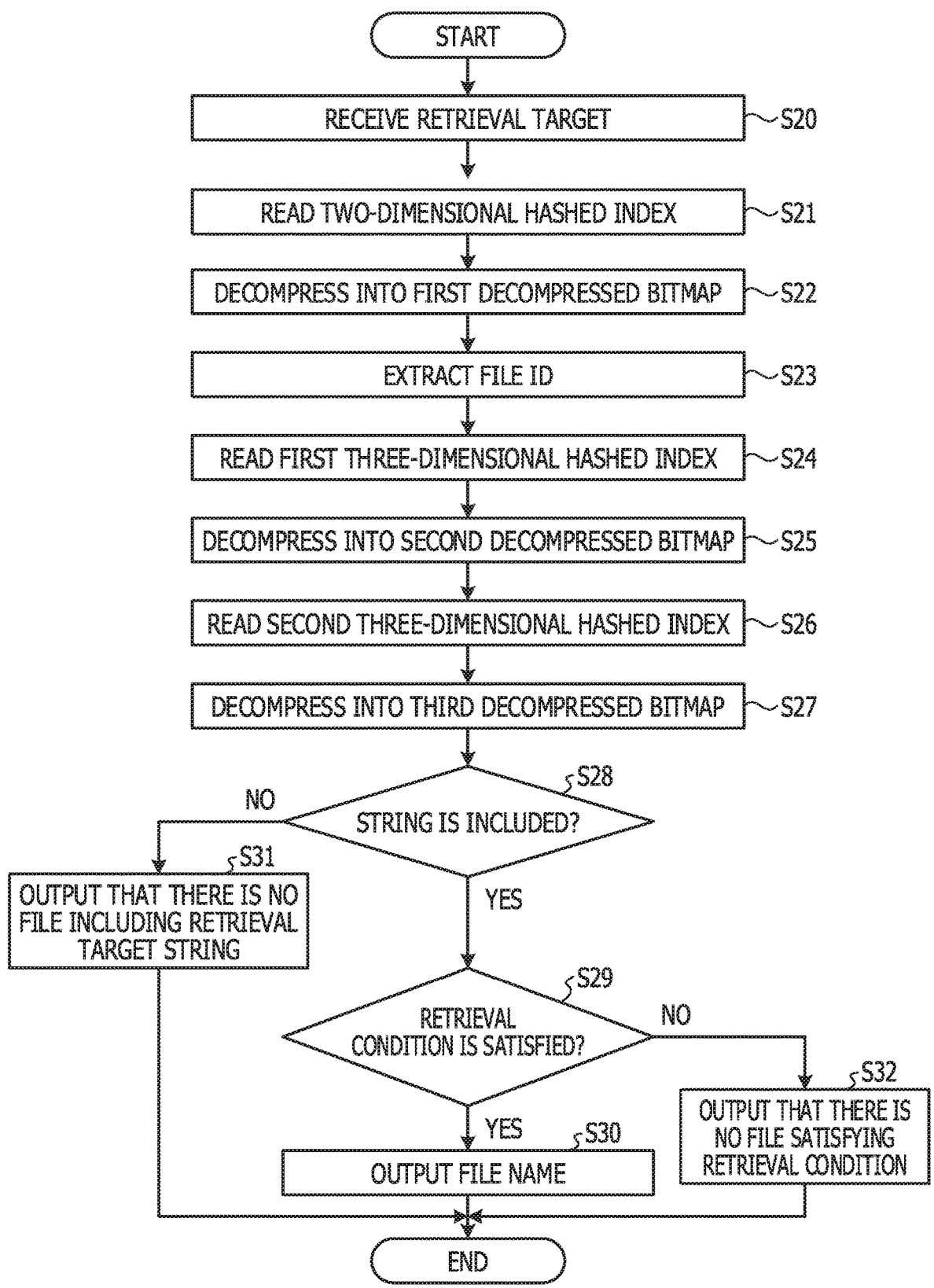
FIG. 13 is a diagram illustrating an example of a flowchart of retrieval processing according to Example 1.

Next, with reference to FIG. 13, description is given of procedures of retrieval processing according to Example 1. FIG. 13 is a diagram illustrating an example of a flowchart of retrieval processing according to Example 1.

The retrieval target receiver 211 receives a retrieval target (S20).

The first decompression unit 212 retrieves a two-dimensional hashed index 222 corresponding to the word ID representing the retrieval target string (S21). The first decompression unit 212 extracts a hashed bitmap from the retrieved two-dimensional hashed index 222 and decompresses the extracted hashed bitmap into the first decompressed bitmap 225 (S22). Based on the first decompressed bitmap 225, the first decompression unit 212 extracts a file ID including all word IDs representing the retrieval target string (S23).

The second decompression unit 213 retrieves a first three-dimensional hashed index 223 based on the file ID and the word ID (S24). The second decompression unit 213 extracts a hashed bitmap from the first three-dimensional hashed index 223, and decompresses the extracted hashed bitmap into the second decompressed bitmap 226 (S25). The second decompression unit 213 retrieves a second three-dimensional hashed index 224 based on the file ID and the ledger sheet item selected as the retrieval condition (S26). The second decompression unit 213 extracts a hashed bitmap from the second three-dimensional hashed index 224, and decompresses the extracted hashed bitmap into the third decompressed bitmap 227 (S27). Note that, when no retrieval condition is selected, the second decompression unit 213 advances the processing without extracting any hashed bitmap from the second three-dimensional hashed index 224, for example.

The retrieval processing unit 214 determines whether or not all the retrieval target strings are included in the second decompressed bitmap 226 (S28). When all the retrieval target strings are included in the second decompressed bitmap 226 (Yes in S28), the retrieval processing unit 214 determines whether or not the retrieval condition is satisfied (S29). Note that, when no retrieval condition is selected, the retrieval processing unit 214 advances the processing without determining whether or not the retrieval condition is satisfied.

When the retrieval condition is satisfied (Yes in S29), the retrieval result output unit 215 outputs the file name, for example, of the file that satisfies the retrieval condition and includes the retrieval target string (S30). On the other hand, when any of the retrieval target strings is not included in the second decompressed bitmap 226 (No in S28), the retrieval result output unit 215 outputs the fact that there is no file including the retrieval target string, as the retrieval result (S31). Meanwhile, when the retrieval condition is not satisfied (No in S29), the retrieval result output unit 215 outputs the fact that there is no file that satisfies the retrieval condition, as the retrieval result (S32).

Advantageous Effects of Example

The ledger sheet output device 100 generates ledger sheet output format data from ledger sheet data. The ledger sheet output device 100 generates index information, for a string, including positional information capable of specifying ledger sheet items and a positional relationship in the ledger sheet data between pieces of data corresponding to the ledger sheet items included in the ledger sheet output format data. The ledger sheet output device 100 outputs an output file including the index information and the ledger sheet output format data. Thus, for example, the retrieval device 200 may quickly determine whether or not there is a retrieval target, by referring to the index information.

The index information includes the positional information capable of specifying the ledger sheet items and the positional relationship between pieces of data included in the ledger sheet output format data. Thus, for example, the retrieval device 200 may quickly determine whether or not the index information corresponds to the retrieval target item, by referring to the index information.

The output file includes encoded data obtained by encoding the ledger sheet output format data as well as the index information in an extended region. For example, when the output file is a PDF file, the encoded data and the index information are included in the extended region of the PDF. Thus, for example, the retrieval device 200 may perform retrieval processing in a state where the ledger sheet output format data is encoded, and may quickly determine whether or not the data corresponds to the retrieval target item.

Note that it is also conceivable, for example, that attribute information, positional information such as strings, and the like are embedded as metadata in the PDF file. However, in this case, the file size is increased. Also, time required to generate the PDF file is increased. On the other hand, the ledger sheet output device 100 embeds, for example, the encoded data obtained by encoding the ledger sheet output format data as well as the index information in the extended region of the PDF file. Thus, the ledger sheet output device 100 may reduce the file size of the output file. The ledger sheet output device 100 may also reduce, for example, the time required to generate the PDF file.

It is also conceivable to compress the ledger sheet data in Zip format, for example, in order to reduce the file size. However, compression in Zip format requires all compressed files to be extended when compressed ledger sheet data is to be used. Therefore, retrieval processing may not be performed until extension of all the files is completed, leading to extended retrieval time. On the other hand, the ledger sheet output device 100 has index information aside from the encoded data. Thus, for example, the retrieval device 200 may quickly determine whether or not the index information corresponds to the retrieval target item, by referring to the index information. Accordingly, the retrieval time may be reduced.

The encoded data is data obtained by encoding the ledger sheet output format data by ledger sheet item. Therefore, the ledger sheet output device 100 may create an output file compressed with a high compression ratio, and thus may reduce the size of the output file. Moreover, for example, the retrieval device 200 may extend the encoded data by ledger sheet item, and may refer to or retrieve only a required portion.

The first three-dimensional hashed indexes 123 and 223 as the index information are bitmap transposed index information centering on the file ID, the word ID, and the positional information of the word ID. Therefore, the ledger sheet output device 100 may reduce the size of the output file compared with the case where the attribute information, the positional information on strings, and the like are embedded as the metadata in the PDF file. Moreover, for example, the retrieval device 200 may quickly perform accurate retrieval processing.

Example 2

Next, Example 2 is described. In Example 2, description is given of a case where the same string is included in different items.

[Example of Ledger Sheet Output Format Data and Bitmap Index According to Example 2]

Figure 14:
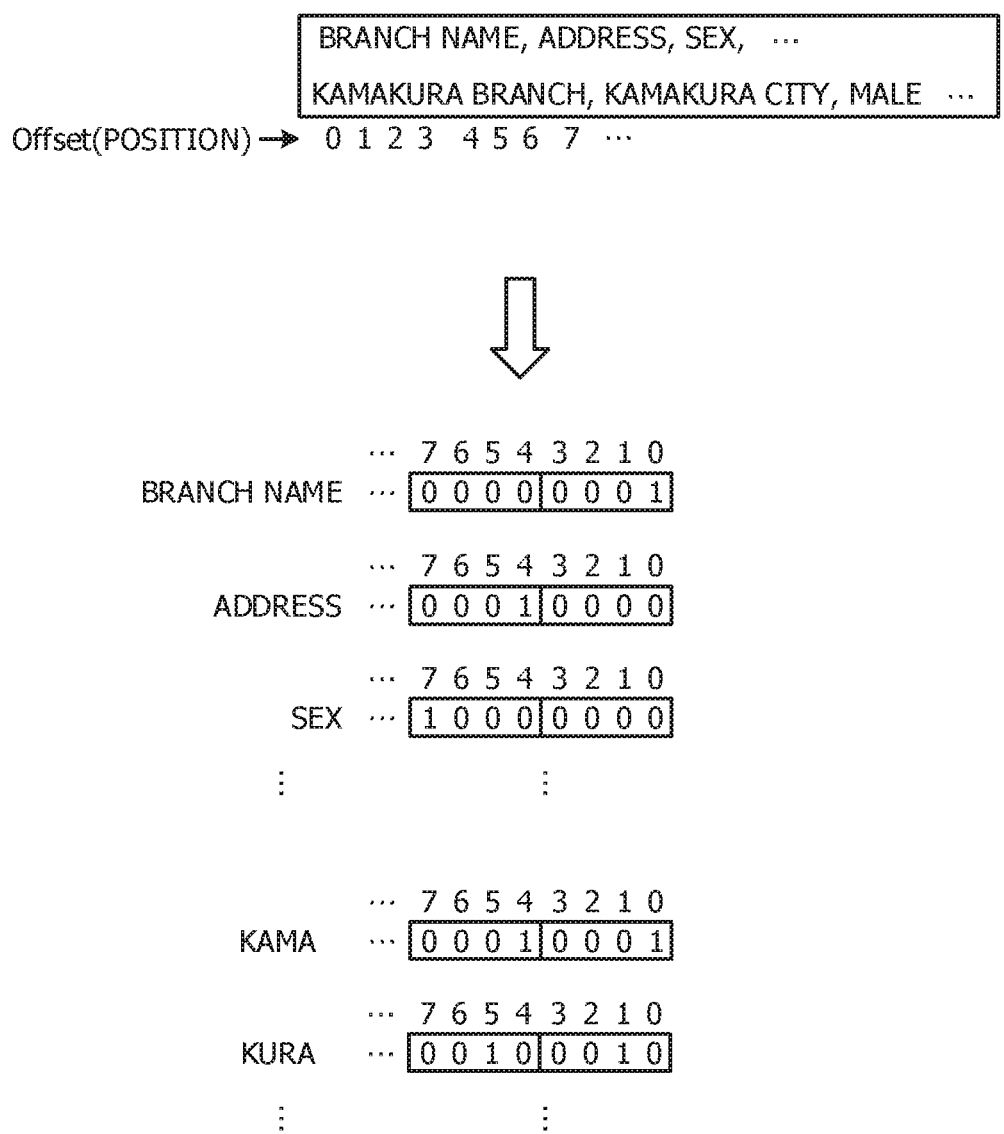
FIG. 14 is a diagram illustrating an example of ledger sheet output format data and a bitmap index according to Example 2.

FIG. 14 is a diagram illustrating ledger sheet output format data and a bitmap index according to Example 2. The ledger sheet output format data illustrated in FIG. 14 includes "branch name", "address", "sex", and the like as ledger sheet items. For example, the "branch name" item includes "Kamakura Branch". For example, the "address" item includes "Kamakura City". For example, the "sex" item includes "male". Note that encoding procedures and hashing procedures in Example 2 are the same as those in Example 1, and thus description thereof is omitted in Example 2. Moreover, in the following description, strings before being encoded into word IDs are used as the strings.

A bitmap index generated by the ledger sheet output device includes strings "Kama" and "Kura" in the different ledger sheet items, for example, "branch name" and "address". Therefore, in a bitmap of "Kama", bit values of the $0^{th}$ and $4^{th}$ bits are set to "1". Also, in a bitmap of "Kura", bit values of the $1^{st}$ and $5^{th}$ bits are set to "1".

[Example of Retrieval Processing According to Example 2]

FIG. 15 is a diagram illustrating an example of an image in which a retrieval target is entered. Here, "address" is selected as a retrieval condition, and "Kamakura" is entered as the retrieval target.

Upon receipt of the retrieval target, the retrieval device sets a mask bit in a bitmap of the item "address" that is the retrieval condition as illustrated in FIG. 16. FIG. 16 is a diagram illustrating an example of the retrieval processing according to Example 2. Once the mask bit is set in the bitmap of the ledger sheet item "address", a bitmap is generated, in which the bit values of the $4^{th}$ to $6^{th}$ bits are set to "1".

Then, the retrieval device performs an AND operation of the bitmap with the mask bit and the bitmap (refinement bitmap 228) as the retrieval result of "Kamakura". Note that the retrieval processing for "Kamakura" is the same as, for example, the retrieval processing described with reference to FIG. 7, and thus description thereof is omitted. Since "Kamakura" is present in the ledger sheet items "branch name" and "address", the bit values of the $1^{st}$ and $5^{th}$ bits are set to "1" in the bitmap as the retrieval result of "Kamakura". However, in the bitmap of the mask bit, the $1^{st}$ bit does not correspond to the ledger sheet item "address", and thus the bit value is set to "0". Therefore, when an AND operation is performed, the bit value of the $1^{st}$ bit is "0" and only the bit value of the $5^{th}$ bit is "1" in a bitmap obtained as the result of the AND operation. In this way, the retrieval device narrows down the retrieval target that satisfies the retrieval condition by performing the AND operation. That is, the retrieval device may narrow down the position of the retrieval target according to the retrieval condition even when the same string is included in more than one item of the ledger sheet.

Example 3

Next, Example 3 is described. In Example 3, description is given of a case where the same string is included in different items and retrieval processing is performed by the record.

[Example of Ledger Sheet Output Format Data and Bitmap Index According to Example 3]

FIG. 17 is a diagram illustrating ledger sheet output format data and a bitmap index according to Example 3. The ledger sheet output format data illustrated in FIG. 17 includes "branch name", "address", and "sex" as ledger sheet items. Note that the ledger sheet output format data may include other items. The ledger sheet output format data illustrated in FIG. 17 also includes a plurality of records. For example, data different only in the item "sex" is included in records 1 and 2. Note that encoding procedures, hashing procedures, and the like in Example 3 are the same as those in Example 1, and thus description thereof is omitted in Example 3. Moreover, in the following description, strings before being encoded into word IDs are used as the strings.

A bitmap index generated by the ledger sheet output device includes strings "Kama" and "Kura" in the different ledger sheet items and different records. Therefore, in a bitmap of "Kama", bit values of the $0^{th}$, $4^{th}$, $8^{th}$, and $12^{th}$ bits are set to "1". In a bitmap of "Kura", bit values of the $1^{st}$, $5^{th}$, $9^{th}$, and $13^{th}$ bits are set to "1". In a bitmap indicating a record separator, "1" is set in the $0^{th}$, $8^{th}$, and $16^{th}$ bits. Note that, in the bitmap indicating the record separator, the bit values of the bits corresponding to the first string in the record are set to "1". The bit map indicating the record separator is generated, for example, as a three-dimensional bitmap index, as in the case of the bitmap for the ledger sheet item, and description of procedures for that processing is omitted.

[Example of Retrieval Processing According to Example 3]

FIG. 18 is a diagram illustrating an example of an image in which a retrieval target is entered. Here, retrieval by the record is selected. Also, "address" is set as retrieval condition 1, and "Kamakura" is entered as the retrieval target. Furthermore, "all" is set as retrieval condition 2, and "female" is entered as the retrieval target.

Upon receipt of the retrieval target, the retrieval device sets a mask bit in a bitmap of the item "address" that is the retrieval condition as illustrated in FIG. 19. FIG. 19 is a diagram illustrating an example of the retrieval processing according to Example 3. Once the mask bit is set in the bitmap of the ledger sheet item "address", a bitmap is generated, in which the bit values of the $4^{th}$ to $6^{th}$ bits and the $12^{th}$ to $14^{th}$ bits are set to "1".

Then, the retrieval device performs an AND operation of the bitmap with the mask bit and the bitmap (refinement bitmap 228) as the retrieval result of "Kamakura". Once the AND operation is performed, the bit values of the $5^{th}$ and $13^{th}$ bits are set to "1" in a bitmap obtained as the result of the AND operation. This represents that "Kamakura" is included in the ledger sheet item "address" in record 1 and in the ledger sheet item "address" in record 2.

When the retrieval condition is "all", the retrieval device outputs a bitmap obtained as a retrieval result of the retrieval target "female", without setting any mask bit, as the bitmap of the AND result. In the bitmap of the AND result of the retrieval target "female", the bit value of the $15^{th}$ bit is set to "1". Note that, when the retrieval condition is "all", the retrieval device may perform an AND operation by setting a mask bit in all the bitmaps of the ledger sheet items.

Based on the bitmap of the AND result, the bitmap of the AND result of the retrieval target "female", and the bitmap indicating the record separation position, the retrieval device determines a record that satisfies the retrieval condition. The retrieval device determines whether or not the bit value is set to "1" in the bitmap of the AND result and the bitmap of the AND result of the retrieval target "female" in the $0^{th}$ to $7^{th}$ bits indicating record 1 in the bitmap indicating the record separation position. The retrieval device also determines whether or not the bit value is set to "1" in the bitmap of the AND result and the bitmap of the AND result of the retrieval target "female" in the $8^{th}$ to $15^{th}$ bits indicating record 2 in the bitmap indicating the record separation position. Here, in the $0^{th}$ to $7^{th}$ bits, the bit values are not set to "1" in the bitmap of the AND result of the retrieval target "female". Therefore, the retrieval device determines that record 1 does not satisfy the retrieval condition. Also, in the $8^{th}$ to $15^{th}$ bits, the bit values are set to "1" in the bitmap of the AND result of the retrieval target "female" and the bit values are set to "1" in the bitmap of the AND result. Therefore, the retrieval device determines that record 2 satisfies the retrieval condition. The retrieval device narrows down and outputs record 2 that satisfies the retrieval condition and includes the retrieval targets "Kamakura" and "female". That is, the retrieval device may narrow down the retrieval target by the record according to the retrieval condition even when the same string is included in more than one record and more than one item in the ledger sheet.

Example 4

Although the examples of the disclosed device have been described above, the disclosed technology may be implemented in various other embodiments than those described above. Therefore, other examples included in the present invention are described below.

When there is more than one file and the like including retrieval targets, a retrieval device 200 according to an example may count the number of the retrieval targets for each file, for example, and preferentially output the file including more retrieval targets. For example, the retrieval device 200 sequentially outputs the files from the one including more retrieval targets. Thus, the file and the like including more retrieval targets may be quickly found.

The description has been given of the case where the ledger sheet output device 100 according to the examples hashes each bitmap based on the hash values (bases) of 29 and 31, assuming a 32-bit register. In the examples, the description has been given of the case where one bitmap has 44 bits. However, the hash values (bases) of 29 and 31 are just an example, and the present invention is not limited thereto. Likewise, the number of bits in the bitmap is just an example, and the present invention is not limited thereto. The two hash values (bases) may be determined according to the number of strings in each of the plurality of files. Assuming, for example, that the number of strings is 10000, two bases are selected such that the number of rows and columns in two dimensions expressed by a remainder of division by one of the bases and a remainder of division by the other base is about 10000. The two bases may be adjacent prime numbers. When the number of rows and columns is 10000, two prime numbers to be selected are 97 and 101 as an example. That is, this is based on the speculation that a group of remainders obtained by one hash and the other hash for a certain string would not collide with (overlap with) a group of remainders obtained for another string in a two-dimensional matrix space with the least common multiple of about 10000.

Moreover, in the above examples, the description has been given of the case where the ledger sheet output device 100 generates hashed bitmaps based on the two hash values (bases) for the bitmap corresponding to the word ID and the bitmaps corresponding to the word ID and the file ID. The ledger sheet output device 100 may detect hash collision (hash noise) when generating hashed bitmaps. For example, since an ultra-high-frequency string is present in more than one file, bit values are set to "1" at a plurality of positions in a bitmap corresponding to the ultra-high-frequency string. Then, when the bitmap is hashed, "1" may be redundantly set at the same positions in the hashed bitmap. Examples of such an ultra-high-frequency string include "the" and "on". Therefore, the ledger sheet output device 100 may reduce the hash noise by monitoring the hash collision for the hash noise and performing 0/1 ratio measurement and bitmap division. For example, when a collision occurs continuously in any one of the hashed bitmaps, the ledger sheet output device 100 calculates a presence/absence (1/0) ratio by using presence and absence information of a bitmap corresponding to the hashed bitmap in which the collision has occurred. When the ratio of "1" is greater than a threshold, the ledger sheet output device 100 divides the bitmap corresponding to the hashed bitmap in which the collision has occurred. As an example, the ledger sheet output device 100 generates a new bitmap by extracting bits at even-numbered positions in the bitmap corresponding to the hashed bitmap in which the collision has occurred. In addition, the ledger sheet output device 100 generates a new bitmap by extracting bits at odd-numbered positions in the bitmap corresponding to the hashed bitmap in which the collision has occurred. Then, the ledger sheet output device 100 stores the divided new bitmaps, for example, in a region of a low-frequency word as a division destination. The ledger sheet output device 100 sets the division destination for either one of the two hashed bitmaps. Then, after dividing the bitmap, the ledger sheet output device 100 generates hashed bitmaps based on two hashed values (bases) for each bitmap of the division destination. Thus, even in the event of data collision in the hashed bitmap, the ledger sheet output device 100 may avoid such data collision by dividing and then hashing even-numbered data and odd-numbered data in a bitmap before hashing.

Moreover, the description has been given of the case where the ledger sheet output device 100 according to the examples generates the hashed index by hashing, for example, in two dimensions (the axis of the word ID and the axis of the file ID) and in three dimensions (the axis of the word ID, the axis of the file ID, and the axis of the string position/the axis of the ledger sheet item, the axis of the file ID, and the axis of the position of the ledger sheet item) based on the plurality of adjacent hash values (bases). However, the ledger sheet output device 100 may adopt the axis of block instead of the axis of file. That is, information indicating the presence or absence of the word ID may be by the block.

Furthermore, the ledger sheet output device 100 according to the examples generates a bitmap index by setting a word ID for each character when a retrieval target string is Japanese. However, the ledger sheet output device 100 may generate a bitmap index by setting a word ID for each word.

The processing procedures, control procedures, specific names, and information including various data and parameters described in the above examples may be arbitrarily changed unless otherwise specified.

[Hardware Configuration]

Figure 20:
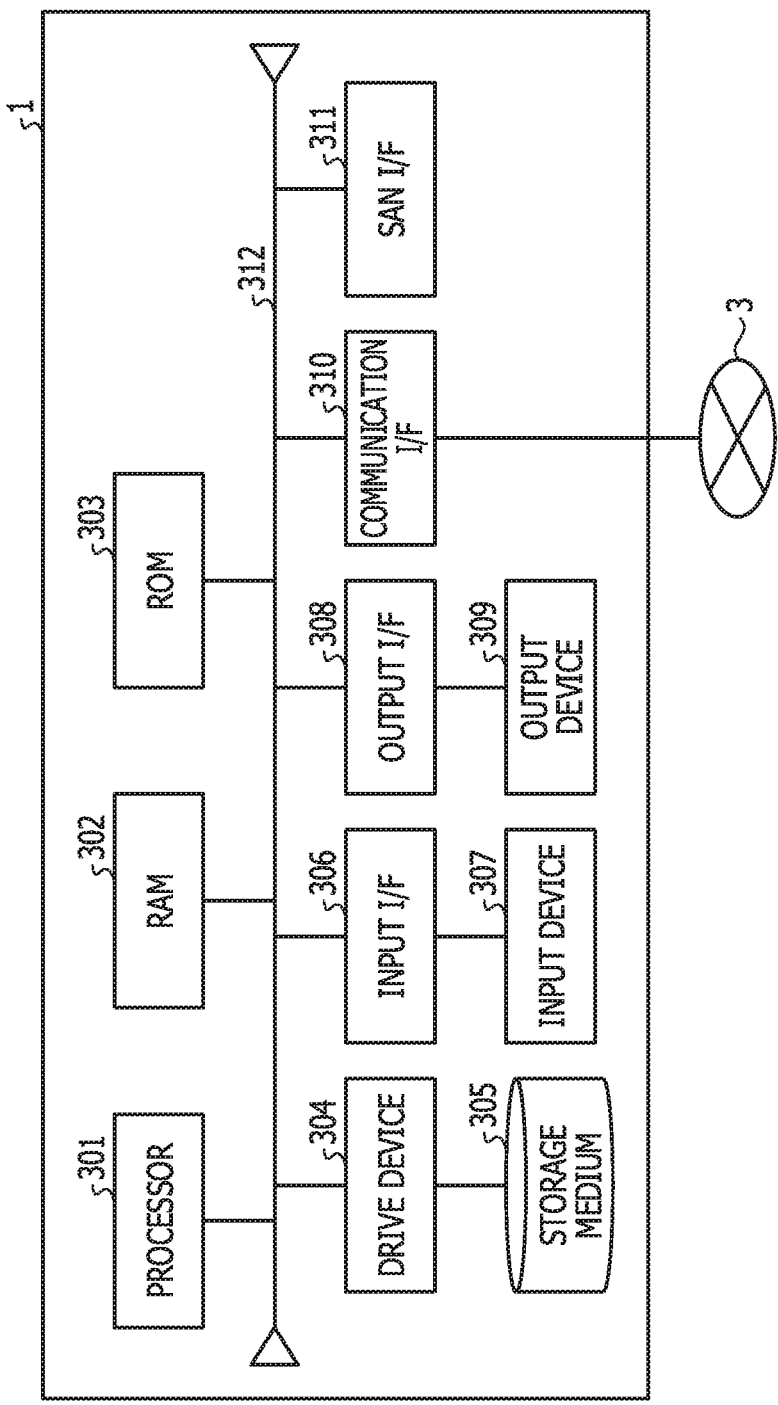
FIG. 20 is a diagram illustrating a hardware configuration example of a computer.

Hardware and software used in the above embodiment are described below. FIG. 20 is a diagram illustrating a hardware configuration example of a computer 1. The computer 1 includes, for example, a processor 301, a RAM (Random Access Memory) 302, a Rom (Read Only Memory) 303, a drive unit 304, a storage medium 305, an input interface (I/F) 306, an input device 307, an output interface (I/F) 308, an output device 309, a communication interface (I/F) 310, a SAN (Storage Area Network) interface (I/F) 311, a bus 312, and the like. The respective pieces of hardware are connected through the bus 312.

The RAM 302 is a readable and writable memory device, and a semiconductor memory such as an SRAM (Static RAM) and a DRAM (Dynamic RAM), or a flash memory, if not the RAM, or the like is used. The ROM 303 includes a PROM (Programmable ROM) and the like. The drive unit 304 is a unit that performs at least one of read and write of information recorded in the storage medium 305. The storage medium 305 stores information written by the drive unit 304. The storage medium 305 is, for example, a hard disk, a flash memory such as an SSD (Solid State Drive), a CD (Compact Disc), a DVD (Digital Versatile Disc), a Blu-ray Disc, or the like. For example, in the computer 1, the drive unit 304 and the storage medium 305 are provided for each of a plurality of kinds of storage media.

The input interface 306 is a circuit that is connected to the input device 307 to transmit an input signal received from the input device 307 to the processor 301. The output interface 308 is a circuit that is connected to the output device 309 to cause the output device 309 to execute output according to an instruction of the processor 301. The communication interface 310 is a circuit that controls communication through a network 3. The communication interface 310 is, for example, a network interface card (NIC) or the like. The SAN interface 311 is a circuit that controls communication with a storage device connected to the computer 1 through a storage area network. The SAN interface 311 is, for example, a host bus adapter (HBA) or the like.

The input device 307 is a device that transmits an input signal in response to an operation. The input signal is, for example, a key device such as a keyboard and a button attached to a main body of the computer 1, or a pointing device such as a mouse and a touch panel. The output device 309 is a device that outputs information in response to control by the computer 1. The output device 309 is, for example, an image output device (display device) such as a display, an audio output device such as a speaker, or the like. For example, an input-output device such as a touch screen is used as the input device 307 and the output device 309. Alternatively, the input device 307 and the output device 309 may be integrated with the computer 1, or may not be included in the computer 1 but, for example, externally connected to the computer 1.

For example, the processor 301 reads a program stored in the ROM 303 or the storage medium 305 into the RAM 302, and performs processing of the control units 110 and 210 according to procedures of the read program. In this event, the RAM 302 is used as a work area for the processor 301. The functions of the storage units 120 and 220 are realized by the ROM 303 and the storage medium 305 storing program files (application program AP 24, middleware MW 23, OS 22, and the like to be described later) and data files (for example, the encoding dictionaries 121 and 221, the two-dimensional hashed indexes 122 and 222, the first three-dimensional hashed indexes 123 and 223, and the like) and by the RAM 302 being used as the work area for the processor 301. The program to be read by the processor 301 is described with reference to FIG. 21.

Figure 21:
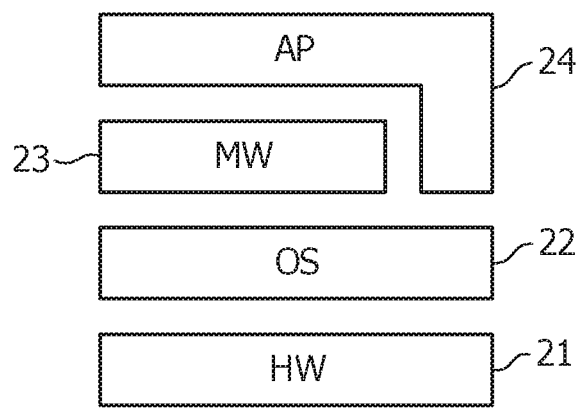
FIG. 21 is a diagram illustrating a configuration example of a program that runs in the computer.

FIG. 21 is a diagram illustrating a configuration example of a program that runs in the computer. An OS (operating system) 22 that controls a hardware group HW 21 (301 to 312) illustrated in FIG. 21 operates in the computer 1. The processor 301 operates through procedures according to the OS 22 to control and manage the hardware group HW 21. Thus, the hardware group HW 21 executes processing according to the application program AP 24 and the middleware MW 23. Furthermore, in the computer 1, the middleware MW 23 or the application program AP 24 is read into the RAM 302 and executed by the processor 301.

When a ledger sheet generation function is called up, the processor 301 performs processing based on at least a part of the middleware MW 23 or the application program AP 24, thereby realizing the functions of the control unit 110 (by controlling the hardware HW group 21 based on the OS 22). When a retrieval function is called up, the processor 301 performs processing based on at least a part of the middleware MW 23 or the application program AP 24, thereby realizing the functions of the control unit 210 (by controlling the hardware HW group 21 based on the OS 22). The encoding function and the retrieval function may be included in the application program AP 24 itself, or may be a part of the middleware MW 23 executed by being called up according to the application program AP 24.

Figure 22:
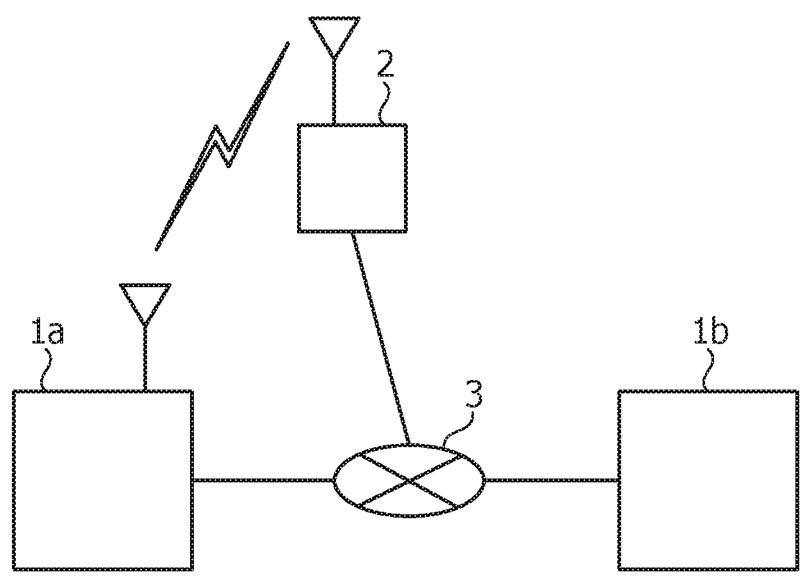
FIG. 22 is a diagram illustrating a configuration example of a device in a system of an example.

FIG. 22 is a diagram illustrating a configuration example of a device in a system of an example. The system illustrated in FIG. 22 includes a computer 1a, a computer 1b, a base station 2, and a network 3. The computer 1a is connected to the network 3 connected to the computer 1b through at least one of wireless connection and wired connection.

The ledger sheet output device 100 and the retrieval device 200 may be included in any of the computers 1a and 1b illustrated in FIG. 22. The computer 1b may include the functions of the ledger sheet output device 100, while the computer 1a may include the functions of the retrieval device 200. Alternatively, the computer 1a may include the functions of the ledger sheet output device 100, while the computer 1b may include the functions of the retrieval device 200. Alternatively, both of the computers 1a and 1b may include the functions of the ledger sheet output device 100 and the functions of the retrieval device 200.

REFERENCE SIGNS LIST

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium recording an indexed data generation program causing a computer to execute processing of:
    generating ledger sheet output format data from ledger sheet data including a plurality of columns and included in a file;
    encoding the ledger sheet output format data including words, characters, or numerical values;
    generating first index information based on word identification information for encoded words, characters, or numerical values and file identification information of the file;
    generating second index information based on the word identification information, the file identification information and word position information in the file for the encoded words, characters, or numerical values;
    generating third index information based on the file identification information, attributes of the plurality of columns and column position information in the file for the plurality of columns; and
    outputting an output file including the first index information, the second index information, the third index information and the ledger sheet output format data.

2. The non-transitory computer-readable recording medium according to claim 1, wherein the output file includes encoded ledger sheet output format data, the first index information, the second index information and the third index information in an extended region of the output file.

3. The non-transitory computer-readable recording medium according to claim 2, wherein the encoded sheet output format data is data obtained by encoding the ledger sheet output format data for each of the attributes of the plurality of columns.

4. The non-transitory computer-readable recording medium according to claim 1, wherein the first index information, the second index information and the third index information are bitmap transposed index information which centers on the words, the characters, or the numerical values, and the file identification information and the positional information.

5. An indexed data generation method comprising:
    generating, by a computer, ledger sheet output format data from ledger sheet data including a plurality of columns and included in a file;
    encoding the ledger sheet output format data including words, characters, or numerical values;
    generating first index information based on word identification information for encoded words, characters, or numerical values and file identification information of the file;
    generating second index information based on the word identification information, the file identification information and word position information in the file for the encoded words, characters, or numerical values;
    generating third index information based on the file identification information, attributes of the plurality of columns and column position information in the file for the plurality of columns; and
    outputting an output file including the first index information, the second index information, the third index information and the ledger sheet output format data.

6. The indexed data generation method according to claim 5, wherein the output file includes encoded data which is obtained by encoding the ledger sheet output format data, the first index information, the second index information and the third index information in an extended region of the output file.

7. The indexed data generation method according to claim 6, wherein the sheet output format encoded data is data obtained by encoding the ledger sheet output format data for each of the attributes of the plurality of columns.

8. The indexed data generation method according to claim 5, wherein the first index information, the second index information and the third index information are bitmap transposed index information which centers on the words, the characters, or the numerical values, and the file identification information and the positional information.

9. A retrieval method comprising:
receiving, by a computer, a retrieval target string which is obtained by combining words, characters, and numerical values;
referring to first index information, second index information and third index information which are obtained by:
generating ledger sheet output format data from ledger sheet data including a plurality of columns and included in a file;
encoding the ledger sheet output format data including words, characters, or numerical values;
generating first index information based on word identification information for encoded words, characters, or numerical values and file identification information of the file;
generating second index information based on the word identification information, the file identification information and word position information in the file for the encoded words, characters, or numerical values; and
generating third index information based on the file identification information, attributes of the plurality of columns and column position information in the file for the plurality of columns; and
determining a file including whether or not the words, the characters, and the numerical values included in the retrieval target string based on the first index information, the second index information and the third index information.

10. The retrieval method according to claim 9, wherein the first index information, the second index information and the third index information are bitmap transposed index information which centers on the words, the characters, or the numerical values, and the file identification information and the positional information.

* * * * *